(12) United States Patent
Zschoch et al.

(10) Patent No.: US 9,120,880 B2
(45) Date of Patent: Sep. 1, 2015

(54) POLYMERIZATION PROCESSES WITH FRESH ETHYLENE DISTRIBUTIONS FOR PREPARATION OF LOW DENSITY ETHYLENE-BASED POLYMERS

(71) Applicants: Werner Zschoch, Naumburg (DE); Otto J. Berbee, Hulst (NL); Cornelis J. Hosman, Ijzendijke (NL)

(72) Inventors: Werner Zschoch, Naumburg (DE); Otto J. Berbee, Hulst (NL); Cornelis J. Hosman, Ijzendijke (NL)

(73) Assignee: Dow Global Technologies LLC, Midland, MI (US)

( * ) Notice: Subject to any disclaimer, the term of this patent is extended or adjusted under 35 U.S.C. 154(b) by 10 days.

(21) Appl. No.: 14/352,506

(22) PCT Filed: Oct. 10, 2012

(86) PCT No.: PCT/US2012/059469
§ 371 (c)(1),
(2) Date: Apr. 17, 2014

(87) PCT Pub. No.: WO2013/059042
PCT Pub. Date: Apr. 25, 2013

(65) Prior Publication Data
US 2014/0288257 A1 Sep. 25, 2014

Related U.S. Application Data

(60) Provisional application No. 61/548,996, filed on Oct. 19, 2011.

(51) Int. Cl.
*C08F 2/02* (2006.01)
*C08F 2/38* (2006.01)
(Continued)

(52) U.S. Cl.
CPC ............... *C08F 110/02* (2013.01); *C08F 10/02* (2013.01)

(58) Field of Classification Search
CPC .............. C08F 2/02; C08F 2/38; C08F 10/02; C08F 2500/08
USPC ................................. 526/64, 232.5, 352.2, 68
See application file for complete search history.

(56) References Cited

U.S. PATENT DOCUMENTS 3,334,081 A 8/1967 Madgwick et al.
3,654,253 A 4/1972 Steigerwald et al.
(Continued)

FOREIGN PATENT DOCUMENTS

DE 120200 A1 6/1976
DE 276598 A3 3/1990
(Continued)

OTHER PUBLICATIONS

Kim at al., Molecular Weight Distribution in Low-Density Polyethylene Polymerization; Impact of Scission Mechanisms in the Case of a Tubular Reactor, Chemical Engineering Science, 59, 2004, 2039-2052.
(Continued)

*Primary Examiner* — Fred M Teskin

(57) ABSTRACT

The invention provides a high pressure polymerization process to form an ethylene-based polymer, the process comprising at least the following steps: feeding ethylene to a first reaction zone and to one or more subsequent reaction zones, and wherein for each subsequent reaction zone that receives fresh ethylene, the ratio, Rn (n=reaction zone number, n>1), of "mass fraction of fresh ethylene fed to the first reaction zone (RZ1)" to "mass fraction of fresh ethylene fed to the nth reaction zone (RZn)" is (Rn=RZ1/RZn) greater than 1, or is from 0 to 0.30, and wherein the "total amount of ethylene fed to the polymerization process" derives from at least one fresh ethylene stream and at least one recycled ethylene stream, and wherein the at least one recycled ethylene stream comprises at least one chain transfer agent and/or comprises at greater than, or equal to, 1 weight %, based on total amount of components in recycled ethylene stream, of one or more non-ethylene components and/or CTA(s); and wherein the inlet feed to each reaction zone comprises less than 5 weight ppm oxygen based on the total weight of mass flows fed to the reaction zone. The invention also provides a high pressure polymerization process to form an ethylene-based polymer, the process comprising at least the following steps: feeding ethylene to a first reaction zone and to one or more subsequent reaction zones, and wherein 100 weight percent of the total amount of fresh ethylene fed to the polymerization process is fed to the first reaction zone, and wherein the "total amount of ethylene fed to the polymerization process" derives from at least one fresh ethylene stream and at least one recycled ethylene stream, and wherein the at least one recycled ethylene stream comprises at least one chain transfer agent and/or comprises at greater than, or equal to, 1 weight %, based on total amount of components in recycled ethylene stream, of one or more non-ethylene components and/or CTA(s); and wherein the inlet stream to each reaction zone comprises less than, or equal to, 5 weight ppm oxygen, based on the total weight of mass flows fed to the reaction zone.

12 Claims, 6 Drawing Sheets

(51) Int. Cl.
*C08F 10/02* (2006.01)
*C08F 110/02* (2006.01)

(56) References Cited

U.S. PATENT DOCUMENTS

| | | | |
|---|---|---|---|
| 3,657,212 | A | 4/1972 | Steigerwald et al. |
| 3,702,845 | A | 11/1972 | Steigerwald et al. |
| 3,917,577 | A | 11/1975 | Trieschmann et al. |
| 5,100,978 | A * | 3/1992 | Hasenbein et al. ............ 526/86 |
| 6,569,962 | B1 | 5/2003 | Zschoch et al. |
| 6,844,408 | B2 | 1/2005 | Gonioukh et al. |
| 7,435,784 | B2 * | 10/2008 | Lee et al. ........................ 526/64 |
| 8,729,186 | B2 | 5/2014 | Berbee et al. |
| 2003/0114607 | A1 | 6/2003 | Donck |
| 2011/0178253 | A1 * | 7/2011 | Karjala et al. ................. 526/64 |
| 2013/0184419 | A1 | 7/2013 | Berbee et al. |
| 2013/0197168 | A1 | 8/2013 | Berbee et al. |

FOREIGN PATENT DOCUMENTS

| | | |
|---|---|---|
| GB | 934444 A | 8/1963 |
| WO | 02/14379 A1 | 2/2002 |

OTHER PUBLICATIONS

PCT/US2012/059469, International Search Report Written Opinion of the International Searching Authority mailed Feb. 6, 2013.
PCT/ US2012/059469, International Preliminary Report on Patentability mailed May 1, 2014.

* cited by examiner

POLYMERIZATION PROCESSES WITH FRESH ETHYLENE DISTRIBUTIONS FOR PREPARATION OF LOW DENSITY ETHYLENE-BASED POLYMERS

REFERENCE TO RELATED APPLICATIONS

The present application claims the benefit of U.S. Provisional Application No. 61/548,996, filed on Oct. 19, 2011, incorporated herein by reference.

BACKGROUND OF THE INVENTION

High pressure, free radical polymerized ethylene-based polymers (for example, LDPE) are usually made in a tubular reactor, or in an autoclave reactor, or sometimes in a combination of these two reactors. In these polymerizations, a chain transfer agent (CTA) is used to regulate the molecular characteristic of the polymer product. It is known that feeding preferentially "make up CTA" to a ethylene inlet (front) feed stream or to a side ethylene feed stream will respectively narrow or broaden the molecular weight distribution (MWD) of the polymer product. Due to the relatively low conversion level of commonly used CTAs, a significant portion of the CTA added to the reactor, is recycled back to the polymerization through the recycle systems, and the recycled CTA is evenly distributed over all the ethylene feeds to the reactor. "Make-up CTA" is added to the reactor feed streams to maintain the correct level of CTA in the polymerization, needed to control the product melt-index. The amount of "make up CTA flow," which depends on the CTA conversion level in the reactor and other losses, such as purge, residual CTA in product, and/or condensation in the recycle and compressor sections, typically varies from 1 to 20 percent of the total amount of CTA added to the polymerization. The location of the feed of the "make-up CTA" can be used to vary the concentration ratio of "the concentration of CTA in the front ethylene feed stream" versus "the CTA in the side ethylene feed stream[s]." "Fresh ethylene" is added to a reactor to replenish converted and lost ethylene (via the purge, etc.). Typically, fresh ethylene is added via the feed streams to the suction (to the inlet) of the Hyper (Secondary) compressor with the help of a Booster and/or a Primary compressor. The conventional methods of feeding CTA using the Primary and/or Booster compressor result in a limited variation of CTA concentration in the reactor feed streams, and these variations are especially limited with CTAs of low activity (for example, see U.S. Publication 2003/0114607).

There is a need for new polymerization processes, by which the CTA concentrations in the reactor can be varied widely, and independently of the "CTA make-up" level in the process. Such a process will significantly increase the range of molecular weight distributions (MWDs) and/or increase the range of the melt strengths, at a given melt index, for the final polymer products.

U.S. Pat. No. 3,334,081 discloses a continuous process for the production of solid polymers of ethylene, as carried out in a tubular reactor, whereby the polymer is obtained at a higher conversion rate. In one embodiment, the process comprises introducing a polymerizable ethylene reaction mixture to the tubular reactor in at least two separate streams, the first stream being injected into the tubular reactor at the inlet end of the tubular reactor, and the subsequent side streams being injected into the tubular reactor at side locations along the tubular reactor. The first stream is a mixture of ethylene and a chain transfer agent, selected from the group consisting of a) a saturated alcohol, b) a saturated aliphatic ketone, c) a saturated aliphatic aldehyde, and d) an alpha olefin. The subsequent side stream injected into the tubular reactor is a mixture of ethylene and the chain transfer agents, as defined above.

U.S. Pat. No. 3,702,845 discloses the polymerization of ethylene in the presence of organic peroxides and oxygen, as free-radical-generating polymerization initiators, and in the presence of polymerization modifiers, in a tubular reactor having two successive reaction zones, to form ethylene homopolymers. A mixture of ethylene, polymerization initiator and polymerization modifier is introduced continuously at the beginning of each reaction zone. The ethylene homopolymers are disclosed as having wide molecular weight distributions, and practically devoid of very high molecular weight constituents. See also U.S. Pat. No. 3,657,212.

U.S. Pat. No. 3,917,577 discloses a process for the continuous polymerization of ethylene, in the presence of a polymerization initiator and a polymerization regulator, in a tubular reactor having two or three successive reaction zones, to form ethylene homopolymers. A mixture of ethylene, polymerization initiator and polymerization regulator is introduced continuously at the beginning of each reaction zone.

U.S. Publication 2003/0114607 discloses a tubular reactor apparatus and processes for the production of polymers, using chain transfer agents and multiple monomer feeds. The apparatus and methods are disclosed as uncoupling or reducing the dependency between monomer concentration and transfer agent concentration.

U.S. Pat. No. 6,569,962 discloses the polymerization of ethylene in a tubular reactor in the presence of radical-forming initiators, oxygen thereunder, and chain transfer agents, of which at least one comprises an aldehydic structure. Chemokinetic characteristics of the reactive feed materials are coupled with the fluidically relevant characteristics of the tubular reactor, to reduce interfering secondary reactions, especially polar-inductive substitution effects.

DD276598A3 (English Translation) discloses a process for adjusting and regulating the input gas streams for multi-zone tubular reactors, with at least two side input streams, for the production of ethylene polymers, by free-radical bulk polymerization, and in the presence of 10 to 50 ppm of oxygen, as polymerization initiator. Also disclosed is a two-step venting of the reaction mixture in an intermediate-pressure product separator, and in a low-pressure product separator, and a separation of the polymer, and returning the unreacted reaction gas to the cycle. A chain regulator and fresh ethylene are added to the low pressure return gas. The resulting gas stream is divided into two gas streams, in a ratio of 2:1 to 1:4, and to one of the gas streams is added oxygen, in an amount from 50 to 500 ppm, and the two gas streams are separately compressed to the intermediate pressure.

Additional polymerizations and/or resins are described in the following: U.S. Pat. No. 3,654,253; DDR120200; GB934444; and Kim at al., *Molecular Weight Distribution in Low-Density Polyethylene Polymerization; Impact of Scission Mechanisms in the Case of a Tubular Reactor*, Chemical Engineering Science, 59, 2004, 2039-2052.

The conventional polymerization processes of the art are very limited in terms of making polymer products with a broad range of molecular distributions and a broad range of melt strengths at a given melt index. It is noted that narrow MWD products are typically made at reduced polymerization temperatures and therefore reduced conversion levels. As discussed above, there is a need for new polymerization processes, by which the CTA concentrations in the reactor can be varied widely, and independently of the "CTA make-up" level in the process. There is a further need for such processes that can be used to form ethylene-based polymers with a wide range of molecular weight distributions (MWDs) and/or a wide range of the melt strengths, at a given melt index. There is also a need for the production of narrow MWD products at higher conversion levels. These needs have been met by the following invention.

SUMMARY OF THE INVENTION

The invention provides a high pressure polymerization process to form an ethylene-based polymer, the process comprising at least the following steps:

feeding ethylene to a first reaction zone and to one or more subsequent reaction zones, and wherein for each subsequent reaction zone that receives fresh ethylene, the ratio, Rn (n=reaction zone number, n>1), of "mass fraction of fresh ethylene fed to the first reaction zone (RZ1)" to "mass fraction of fresh ethylene fed to the nth reaction zone (RZn)" is (Rn=RZ1/RZn) greater than 1, or is from 0 to 0.30, and wherein the "total amount of ethylene fed to the polymerization process" derives from at least one fresh ethylene stream and at least one recycled ethylene stream, and wherein the at least one recycled ethylene stream comprises at least one chain transfer agent and/or comprises greater than, or equal to, 1 weight %, based on total amount of components in the recycled ethylene stream, of one or more non-ethylene components and/or CTA(s); and wherein the inlet stream to each reaction zone comprises less than, or equal to, 5 weight ppm oxygen, based on the total weight of mass flows fed to the reaction zone.

The invention also provides a high pressure polymerization process to form an ethylene-based polymer, the process comprising at least the following steps:

feeding ethylene to a first reaction zone and to one or more subsequent reaction zones, and wherein 100 weight percent of the total amount of fresh ethylene fed to the polymerization process is fed to the first reaction zone, and wherein the "total amount of ethylene fed to the polymerization process" derives from at least one fresh ethylene stream and at least one recycled ethylene stream, and wherein the at least one recycled ethylene stream comprises at least one chain transfer agent and/or comprises greater than, or equal to, 1 weight %, based on total amount of components in recycled ethylene stream, of one or more non-ethylene components and/or CTA(s); and wherein the inlet stream to each reaction zone comprises less than, or equal to, 5 weight ppm oxygen, based on the total weight of mass flows fed to the reaction zone.

Figure 1:
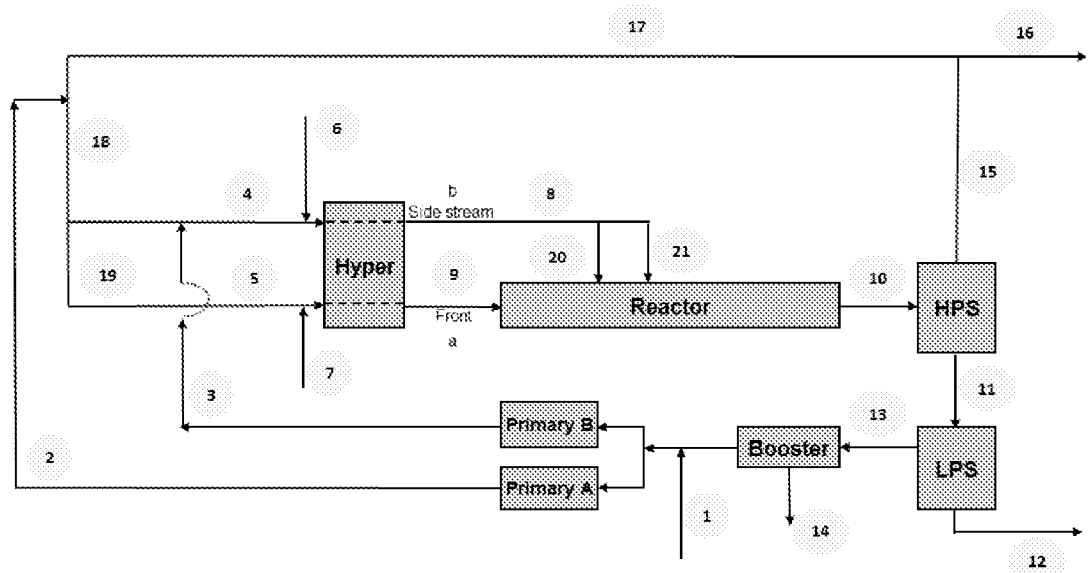
FIG. 1 depicts a polymerization flow scheme for a comparative polymerization process.
Figure 2:
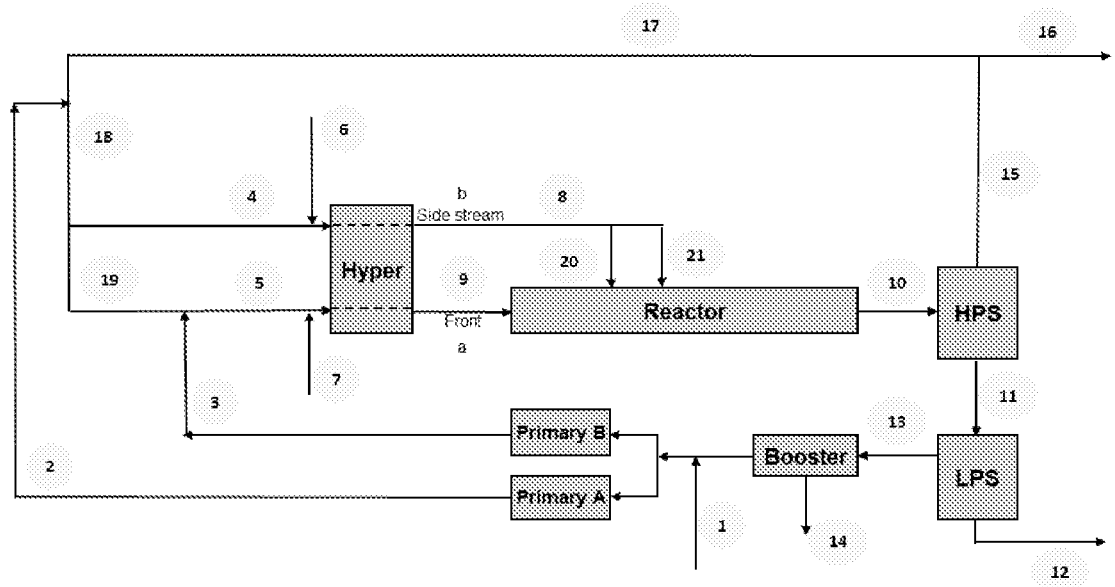
FIG. 2 depicts a polymerization flow scheme for an inventive polymerization process.
Figure 3:
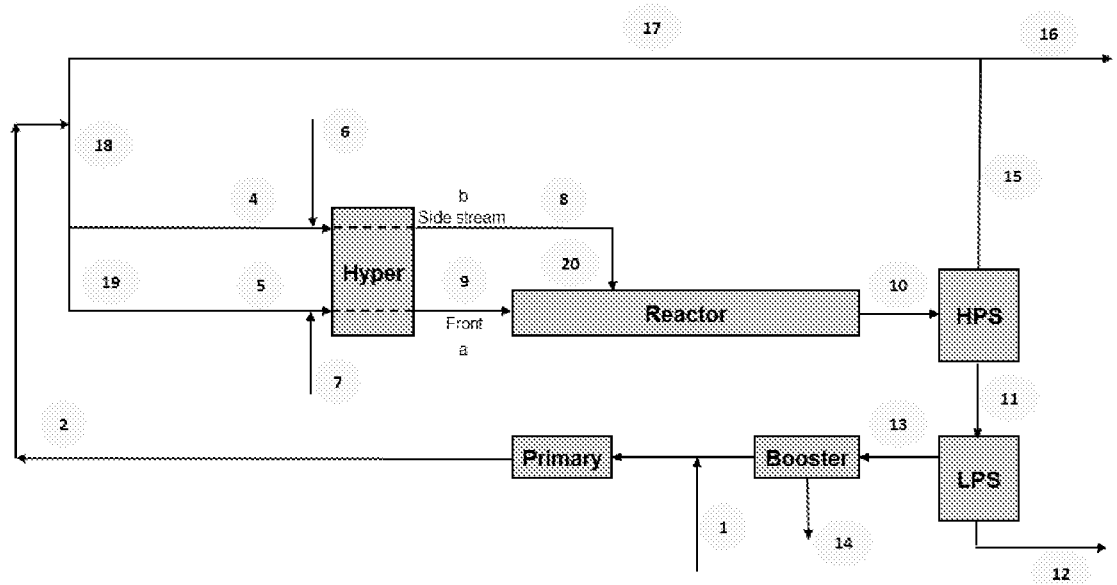
FIG. 3 depicts a polymerization flow scheme for a comparative polymerization process, showing a standard line up of a Primary compressor and a Booster compressor.
Figure 4:
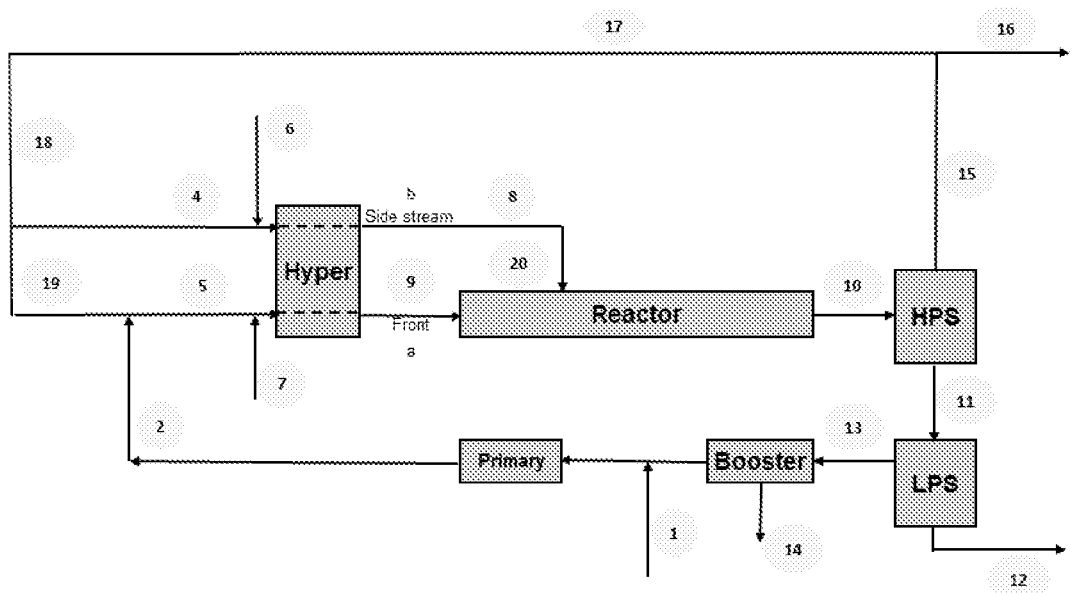
FIG. 4 depicts a polymerization flow scheme for an inventive polymerization process, showing all Primary capacity to a front stream.
Figure 5:
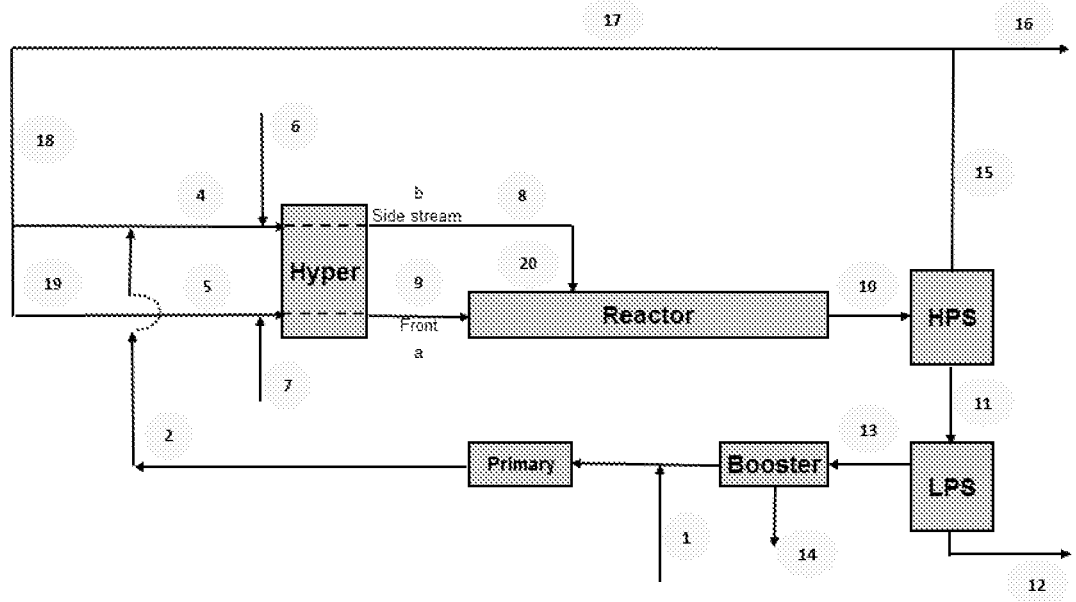
FIG. 5 depicts a polymerization flow scheme for an inventive polymerization process, showing all Primary capacity to a side stream.
Figure 6:
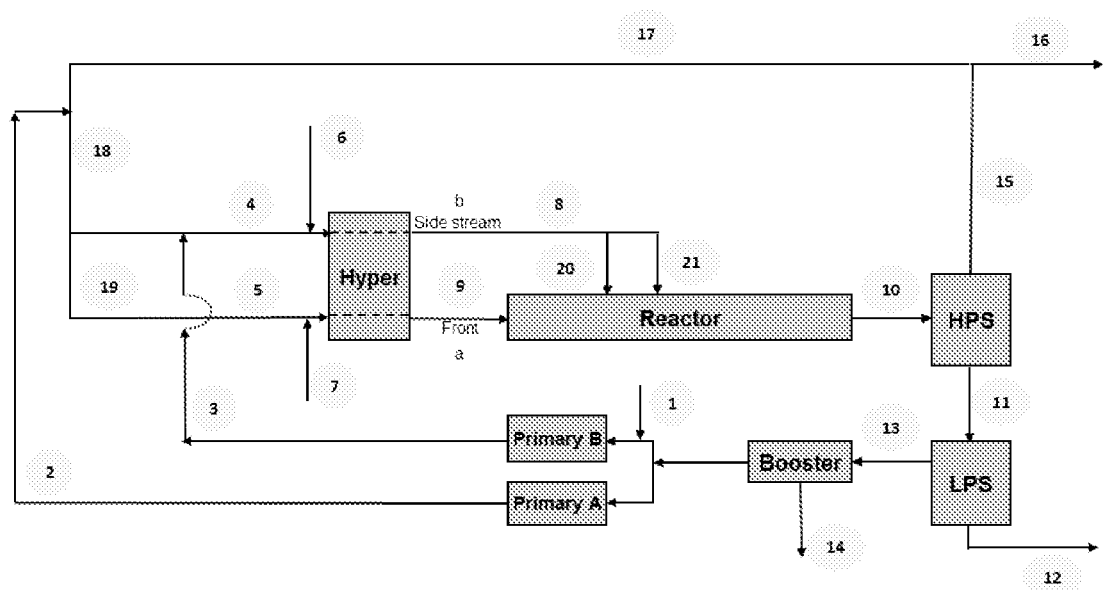
FIG. 6 depicts a polymerization flow scheme for an inventive polymerization process, showing a Booster line up to Primary A, Primary A line-up to High Pressure Recycle, and Primary B line-up to a side stream.
Figure 7:
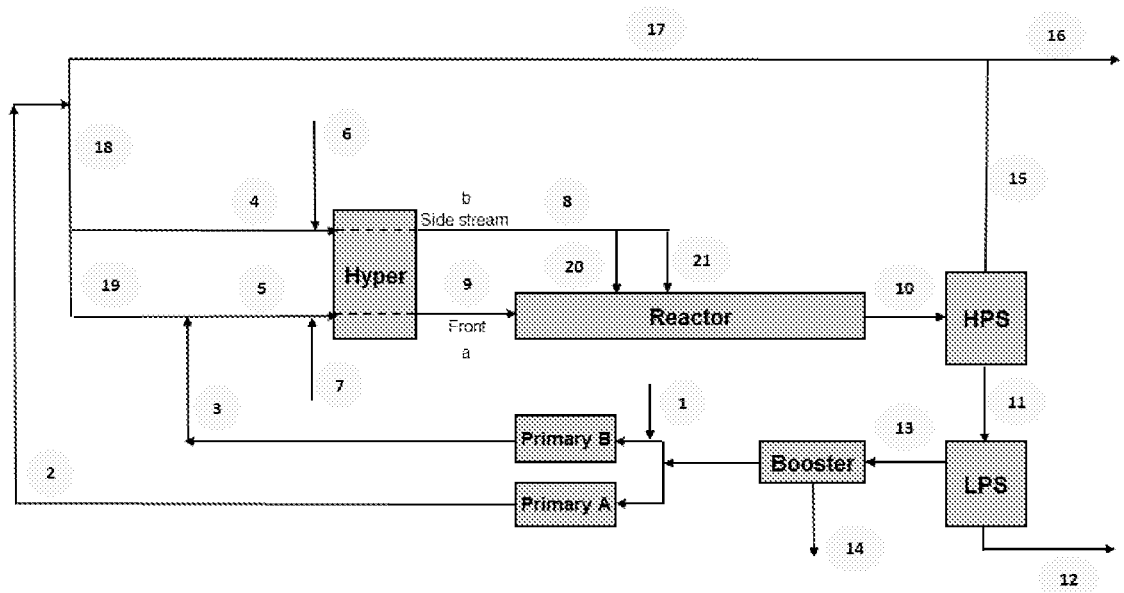
FIG. 7 depicts a polymerization flow scheme for an inventive polymerization process, showing a line-up of Primary B to a front stream, and line-up of Booster compressor to the High Pressure Recycle.

In the polymerization flow schemes, "HPS" refers to "High Pressure Separator," and "LPS" refers to "Low Pressure Separator."

DESCRIPTION OF EMBODIMENTS OF THE INVENTION

As discussed above, in a first aspect, the invention provides a high pressure polymerization process to form an ethylene-based polymer, the process comprising at least the following steps:

feeding ethylene to a first reaction zone and to one or more subsequent reaction zones, and wherein for each subsequent reaction zone that receives fresh ethylene, the ratio, Rn (n=reaction zone number, n>1), of "mass fraction of fresh ethylene fed to the first reaction zone (RZ1)" to "mass fraction of fresh ethylene fed to the nth reaction zone (RZn)" is (Rn=RZ1/RZn) greater than 1, or is from 0 to 0.30, and wherein the "total amount of ethylene fed to the polymerization process" derives from at least one fresh ethylene stream and at least one recycled ethylene stream, and wherein the at least one recycled ethylene stream comprises at least one chain transfer agent and/or comprises greater than, or equal to, 1 weight %, based on total amount of components in recycled ethylene stream, of one or more non-ethylene components and/or CTA(s); and wherein the inlet stream to each reaction zone comprises less than, or equal to, 5 weight ppm oxygen, based on the total weight of mass flows fed to the reaction zone.

An inventive process may comprise a combination of two or more embodiments as described herein.

In one embodiment, Rn is greater than 1.

In one embodiment, Rn is zero.

In one embodiment, Rn is from 0 to 0.25, or from 0 to 0.20.

In one embodiment, Rn is from 0 to 0.15, or from 0 to 0.10.

In one embodiment, when no (0%) fresh ethylene is fed to the first reaction zone, the "amount of ethylene fed to the first reaction zone" derives only from at least one recycled ethylene stream.

In one embodiment, the "total amount of ethylene fed to the polymerization process" derives from a fresh ethylene stream and at least one recycled ethylene stream, and wherein the at least one recycled ethylene stream comprises at least one chain transfer agent, and wherein, when no (0%) fresh ethylene is fed to the first reaction zone, than the "amount of ethylene fed to the first reaction zone" derives only from at the least one recycled ethylene stream.

In one embodiment, from "greater than 0" to 100 weight percent of the total amount of fresh ethylene fed to the polymerization process, is fed to the first reaction zone and/or to a sequential reaction zone. In a further embodiment, the first reaction zone is a tubular reaction zone.

In one embodiment, from 10 to 90, or from 20 to 80, or from 30 to 70, weight percent of the total amount of fresh ethylene fed to the polymerization process, is fed to the first reaction zone and/or to a sequential reaction zone. In a further embodiment, the first reaction zone is a tubular reaction zone.

In a second aspect, the invention also provides a high pressure polymerization process to form an ethylene-based polymer, the process comprising at least the following steps:

feeding ethylene to a first reaction zone and to one or more subsequent reaction zones, and wherein 100 weight percent of the total amount of fresh ethylene fed to the polymerization process is fed to the first reaction zone, and wherein the "total amount of ethylene fed to the polymerization process" derives from at least one fresh ethylene stream and at least one recycled ethylene stream, and wherein the at least one recycled ethylene stream comprises at least one chain transfer agent and/or comprises greater than, or equal to, 1 weight %, based on total amount of components in recycled ethylene stream, of one or more non-ethylene components and/or CTA(s); and wherein the inlet stream to each reaction zone comprises less than, or equal to, 5 weight ppm oxygen, based on the total weight of mass flows fed to the reaction zone.

An inventive process may comprise a combination of two or more embodiments as described herein.

The following embodiments apply to both the first aspect and second aspect of the invention.

In one embodiment, the at least one recycled ethylene stream comprises at least one chain transfer agent.

In one embodiment, the at least one recycled ethylene stream comprises greater than, or equal to, 1 weight %, based on total amount of components in recycled ethylene stream, of one or more non-ethylene components and/or CTA(s).

In one embodiment, the at least one recycled ethylene stream comprises at least one chain transfer agent and comprises greater than, or equal to, 1 weight %, based on total amount of components in recycled ethylene stream, of one or more non-ethylene components and/or CTA(s).

In one embodiment, the process comprises at least one Primary compressor and at least one Booster compressor.

In one embodiment, the ethylene stream from the Booster compressor is fed only to one Primary compression flow, and wherein the Primary compressor has at least two separate compression flows.

In one embodiment, the ethylene stream from the Booster compressor is fed only to one compression flow of the Primary compressor, and wherein the Primary compressor has at least two separate compression flows.

In one embodiment, the first reaction zone is a tubular reaction zone.

In one embodiment, each reaction zone is a tubular reaction zone.

In one embodiment, the first reaction zone is an autoclave reaction zone.

In one embodiment, the "total amount of ethylene fed to the polymerization process" derives from a fresh ethylene stream and at least one recycled ethylene stream, and wherein the at least one recycled ethylene stream comprises at least one chain transfer agent.

In one embodiment, the at least one recycled ethylene stream is fed only to an inlet feed stream or only to a side feed stream.

In one embodiment, the first reaction zone is a tubular reaction zone.

In one embodiment, the inlet feed to each reaction zone comprises less than, or equal to, 3 or less than, or equal to, 2, or less than, or equal to, 1 weight ppm oxygen, based on the total weight of mass flows fed to the reaction zone.

In one embodiment, the fresh ethylene does not contain a chain transfer agent other than one or more residual compounds originating from the ethylene production/fractionation process.

In one embodiment, the polymerization process operates without "injected" CTA, and with only "impurity" CTA compound(s) from ethylene-rich feed stream(s).

In one embodiment, the process comprises only one Primary compressor.

In one embodiment, the ethylene-based polymer is a polyethylene homopolymer.

In one embodiment, the ethylene-based polymer is an ethylene-based interpolymer comprising at least one comonomer.

In one embodiment, each feed to each reaction zone contains the same CTA system. In a further embodiment the CTA system of each feed contains a single CTA.

In one embodiment, at least one of the feeds to at least one of the reaction zones contains a CTA system that is different from at least one of the CTA system(s) to at least one other reaction zone.

In one embodiment, at least one of the feeds to at least one of the reaction zones contains a CTA that is different from at least one of the CTAs to the other reaction zones.

In one embodiment, each CTA is independently is selected from an olefin, an aldehyde, a ketone, an alcohol, a saturated hydrocarbon, an ether, a thiol, a phosphine, an amino, an amine, an amide, an ester, or an isocyanate.

In one embodiment, the maximum polymerization temperature in each reaction zone is, independently, greater than, or equal to, 100° C., and the inlet pressure in each reaction zone is, independently, greater than, or equal to, 100 MPa.

In one embodiment, each of the polymerization conditions in the reaction zones, independently, comprises a set temperature less than 400° C., and an inlet pressure less than 1000 MPa, or less than 500 MPa.

In one embodiment, the maximum polymerization temperature in each reaction zone is, independently, from 100 to 400° C.

An inventive process may comprise a combination of two or more embodiments as described herein.

The invention also provides an ethylene-based polymer made by an inventive process.

In one embodiment, the ethylene-based polymer is a polyethylene homopolymer.

In one embodiment, the ethylene-based polymer is an ethylene-based interpolymer.

In one embodiment, the ethylene-based polymer has a density from 0.910 to 0.940 g/cm$^3$.

In one embodiment, the ethylene-based polymer has a melt index from 0.1 to 20 g/10 min.

In one embodiment, the ethylene-based polymer has a density from 0.910 to 0.940 g/cm$^3$, and a melt index from 0.1 to 20 g/10 min An inventive polymer may comprise a combination of two or more embodiments as described herein.

The invention also provides a composition comprising an inventive ethylene-based polymer.

In one embodiment, the composition further comprises another ethylene-based polymer.

An inventive composition may comprise a combination of two or more embodiments as described herein.

The invention also provides an article comprising at least one component formed an inventive composition. In one embodiment, the article is an extrusion coating resin. In another embodiment, the article is a film. In another embodiment, the article is an insulation material and/or a protection layer around a metal wire. In another embodiment, the article is a foam.

An inventive article may comprise the combination of two or more embodiments as described herein.

Polymerizations

For a high pressure, free radical initiated polymerization process, two basic types of reactors are known. The first type is an agitated autoclave vessel with one or more reaction zones (autoclave reactor). The second type is a jacketed tube reactor, which tube has one or more reaction zones (the tubular reactor). The high pressure process of the present invention to produce polyethylene homo or interpolymers (for example copolymers) can be carried out in an tubular and/or autoclave reactor, each having at least two reaction zones. For example, one or more tubular reactors (in series or in parallel); one or more tubular reactors and one or more autoclave reactors (in series or in parallel); one or more autoclave reactors (in series or in parallel); and one or more autoclave reactors and one or more tubular reactors (in series or in parallel). In one embodiment, the polymerization is carried out in one or more tubular reactors (in series or in parallel, and preferably in series).

The temperature in each reaction zone of the process is typically from 100 to 400° C., more typically from 120 to 360° C., and even more typically from 140 to 340° C. The pressure at the inlet (pressure can be measured by using a pressure transducer located in the feed line to the inlet) in each reaction zone of the process is typically from 100 to 500 MPa, more typically from 120 to 400 MPa, and even more typically from 150 to 350 MPa. Examples of suitable reactor systems are described in U.S. Publication No. 2003/0114607 and DD276598A3. Commercial, high pressure polymerization processes are typically equipped with recycle systems, in order to maximize the conversion of the incoming ethylene to polymer, and to reduce compression energy. A high pressure recycle typically operates at inlet pressures from 50 to 600 bar, more typically from 120 to 500 bar and even more typically from 200 to 400 bar.

Initiators

The process of the present invention is a free radical polymerization process. Free radical-generating compounds include, but are not limited to, organic peroxides, such as peresters, perketals, peroxy ketones and percarbonates, di-tert-butyl peroxide, cumyl perneodecanoate, and tert-amyl perpivalate. Other suitable initiators include azodicarboxylic esters, azodicarboxylic dinitriles, and 1,1,2,2-tetramethylethane derivatives. These organic peroxy initiators can be used in conventional amounts from 0.005 to 0.2 weight percent, based on the weight of polymerizable monomers. Peroxides are typically injected as diluted solutions in a suitable solvent, for example, in a hydrocarbon solvent.

In one embodiment, an initiator is added to at least one reaction zone of the polymerization, and wherein the initiator has a "half-life temperature at one second" greater than 255° C., preferably greater than 260° C. In a further embodiment, such initiators are used at a peak polymerization temperature from 320° C. to 350° C. In a further embodiment, the initiator comprises at least one peroxide group incorporated in a ring structure.

Examples of such initiators include, but are not limited to, TRIGONOX 301 (3,6,9-triethyl-3,6,9-trimethyl-1,4,7-triperoxonaan) and TRIGONOX 311 (3,3,5,7,7-pentamethyl-1,2,4-trioxepane), both available from Akzo Nobel, and HMCH-4-AL (3,3,6,6,9,9-hexamethyl-1,2,4,5-tetroxonane) available from United Initiators. See also International Publication Nos. WO 02/14379 and WO 01/68723.

Chain Transfer Agents (CTA)

Chain transfer agents or telogens are used to control the melt index in a polymerization process. Chain transfer involves the termination of growing polymer chains, thus limiting the ultimate molecular weight of the polymer material. A chain transfer agent is typically a component (for example, an organic molecule) able to transfer a hydrogen atom to a growing polymer molecule containing a radical, by which a radical is formed on the chain transfer agent, which can then initiate a new polymer chain. These agents can be of many different types, from saturated hydrocarbons, or unsaturated hydrocarbons, to aldehydes, ketones, or alcohols. By controlling the concentration of the selected chain transfer agent, one can control the length of polymer chains, and, hence the molecular weight, for example, the number average molecular weight, Mn. The melt flow index (MFI or $I_2$) of a polymer, which is related to Mn, is controlled in the same way.

The chain transfer agents used in the process of this invention include, but are not limited to, aliphatic and olefinic hydrocarbons, such as pentane, hexane, cyclohexane, propene, pentene or hexane; ketones such as acetone, diethyl ketone or diamyl ketone; aldehydes such as formaldehyde or acetaldehyde; and saturated aliphatic aldehyde alcohols such as methanol, ethanol, propanol or butanol.

Comonomers like vinyl actetate, alkyl acrylates, etc., can also show chain transfer activity. Copolymers made with high levels of these comonomers are typically made with low level, or no, additional CTA. The distribution of fresh ethylene and recycle ethylene containing unconverted comonomer, like vinyl acetate, could have a similar effect on MWD, as described herein.

Polymers

In one embodiment, the ethylene-based polymers of this invention have a density from 0.910 to 0.940, more typically from 0.912 to 0.940 and even more typically from 0.915 to 0.935, grams per cubic centimeter (g/cc or g/cm$^3$). In one embodiment, the ethylene-based polymers of this invention have a typical melt index ($I_2$) from 0.1 to 100, more typically from 0.15 to 50, and even more typically from 0.2 to 20, grams per 10 minutes (g/10 min) at 190° C./2.16 kg. In one embodiment, the ethylene-based polymers of this invention have a typical Mw/Mn from 3 to 20, or from 3.5 to 16, or from 4 to 14. In one embodiment, the ethylene-based polymers of this invention have a melt strength from 0.5 to 40, or from 1 to 30 centiNewtons (cN). In one embodiment, the ethylene-based polymers of this invention have two or more of these density, melt index, Mw/Mn and melt strength properties.

Ethylene-based polymers include LDPE homopolymer, and high pressure copolymers, including ethylene/vinyl acetate (EVA), ethylene ethyl acrylate (EEA), ethylene butyl acrylate (EBA), ethylene acrylic acid (EAA), ethylene vinyl silane (EVS), ethylene vinyl trimethyl silane (EVTMS), and other copolymers made with "silane-containing" comonomers, copolymers made with dienes (for example, ENB) or polyenes, and ethylene carbon monoxide (ECO). Other comonomers are described in Ehrlich, P.; Mortimer, G. A.; Adv. Polymer Science; Fundamentals of Free-radical Polymerization of Ethylene; Vol. 7, pp. 386-448 (1970).

Additives

An inventive composition may comprise at least one additive. Suitable additives include, but are not limited to, fillers, antioxidants and other stabilizers, colorants, extenders, crosslinkers, blowing agents, and plasticizers. In addition, other natural and synthetic polymers, including other polymers that are made according to the inventive process, and polymers made by other processes, may be added to an inventive composition.

Blends

The inventive polymers can be blended with one or more other polymers, such as, but not limited to, linear low density polyethylene (LLDPE); copolymers of ethylene with one or more alpha-olefins, such as, but not limited to, propylene, butene-1, pentene-1, 4-methylpentene-1, pentene-1, hexene-1 and octene-1; high density polyethylene (HDPE), such as, for example, HDPE grades HD 940-970 available from The Dow Chemical Company. The amount of inventive polymer in the blend can vary widely, but typically it is from 10 to 90, or from 15 to 85, or from 20 to 80, weight percent, based on the weight of the polymers in the blend. The LDPE (inventive)/LLDPE blends typically provide good optics, and/or are useful in the preparation of laminations, and/or are useful in such applications as films, extrusion coatings, foams, and wire and cables.

Applications

An inventive composition may be employed in a variety of conventional thermoplastic fabrication processes to produce useful articles, including extrusion coatings; films; and molded articles, such as blow molded, injection molded, or rotomolded articles; foams; wire and cable, fibers, and woven or non-woven fabrics.

DEFINITIONS

Unless stated to the contrary, implicit from the context, or customary in the art, all parts and percents are based on weight, and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The term "high pressure polymerization process," as used herein, refers to a free radical polymerization process carried out at an elevated pressure of at least 1000 bar (100 MPa).

The phrase "total amount of fresh ethylene fed to the polymerization process," as used herein, refers to the mass sum of the fresh ethylene feed(s) fed to the "n" reaction zones.

The term "fresh ethylene," as used herein, refers to ethylene provided from external source(s) and not from internal recycled ethylene source(s). The fresh ethylene is used as the "make-up ethylene" required to compensate for the ethylene consumed by the polymerization and/or lost through, for example, purge from the process and residual ethylene in polymer. The fresh ethylene is typically produced and supplied with a high purity of 99.8 wt % or more, based on total weight of the fresh ethylene supply. The major impurities are methane and ethane. A fresh ethylene feed stream contains only fresh ethylene as the ethylene component.

The phrase "total amount of ethylene fed to the polymerization process," as used herein, refers to the mass sum of all reactor ethylene-rich feed streams that consists of ethylene as major component, typically greater than 90 wt %, and typically greater than, or equal to, 96 wt %, based on the total weight of the feed, which includes, in addition to ethylene, non-ethylene components (components other than ethylene), like, for example, methane, ethane, solvent, CTA, and/or peroxide dissociation products.

The term "ethylene-rich feed stream," as used herein, refers to a feed stream comprising a majority amount of ethylene, based on the weight of the feed stream; for example, a fresh ethylene feed stream or a recycled ethylene feed stream. Due to the presence of non-ethylene components (for example, methane, ethane, etc.) or the addition, or use, of other components (CTA, peroxide, peroxide decomposition components, solvent, etc.), the ethylene concentration in fresh and recycled ethylene will be typically, respectively, around 99.8 wt % and around 97 wt %, based on the weight of the feed. In case of low reactivity comonomers, like vinyl acetate, the ethylene concentration can be further reduced, and may go as low as 60 weight percent.

The term "recycled ethylene," as used herein, refers to the ethylene that is removed from the polymer in the high pressure and low pressure separators, and the recycled ethylene comprises ethylene not converted in the reactor. A recycled ethylene feed stream comprises recycled ethylene.

The term "mass fraction," as used herein, refers to the mass ratio of one component in a mixture to the total mass of the mixture. Mass fraction can be determined by calculating the ratios between mass amounts or mass flows.

The phrase "mass fraction of fresh ethylene fed to the first reaction zone (RZ1)," as used herein, refers to the amount of fresh ethylene fed to the first reaction zone divided by the amount of total ethylene fed to the first reaction zone.

The phrase "mass fraction of fresh ethylene fed to the nth reaction zone (RZn)," as used herein, refers to the amount of fresh ethylene fed to the nth reaction zone divided by the amount of total ethylene fed to the nth reaction zone.

The terms "inlet stream" or "reaction zone inlet stream," as used herein, refer to the total mass flow at the inlet of a reaction zone, and consists of the mass flow transferred from the previous reaction zone plus optional ethylene-rich feed streams.

The terms "side stream" or "side feed stream," as used herein, refer to the ethylene-rich feed stream to sequential reaction zones.

The term "front inlet feed stream," as used herein, refers to the ethylene-rich feed stream fed to the first reaction zone.

The term "reaction zone inlet feed stream," as used herein, refers to the ethylene-rich feed stream fed to the reaction zone.

The phrase "feed to the nth reaction zone," as used herein, refers to the "total mass flow at the nth reaction zone inlet" minus "the mass flow coming from the (n−1)th reaction zone outlet."

The term "reaction zone," as used herein, refers to a reactor zone where polymerization reaction is initiated or reinitiated by addition of radicals or components which dissociate into, and/or generate, radicals. Typically, the reaction medium is heated and/or cooled by a heat transfer medium flowing through the jacket around the reactor.

The term "first reaction zone," as used herein, refers to the first reactor zone where the polymerization is first initiated by the addition of radicals or components which dissociate into, and/or generate, radicals. The first reaction zone ends at the point where there is a new feed of fresh and/or recycled ethylene and/or of radicals and/or components which dissociate into, and/or generate, radicals.

The terms "subsequent reaction zone," or "sequential reaction zone," as used herein, refer to a reactor zone which receives ethylene and polymer from a previous reactor zone, and where radicals or components, which dissociate into, and/or generate, radicals, are added at the inlet of the subsequent (or sequential) reactor zone. The subsequent (or sequential) reaction zone ends at the point where there is a new feed of fresh and/or recycled ethylene and/or of radicals and/or components which dissociate into, and/or generate, radicals; however, the nth reaction zone ends at the position of a pressure control device of the reactor system. The number of subsequent (or sequential) reaction zones is (n−1), where n is the total number of reaction zones.

The term "make-up CTA," as used herein, refers to the feed stream of CTA needed to compensate for the converted and/or lost CTA in the high pressure polymerization process, and is typically needed to control or to change the product melt index.

The terms "CTA activity," or "chain transfer activity coefficient (Cs value)" as used herein, refer to the ratio between the "rate of chain transfer" to the "rate of ethylene propagation." See Mortimer references.

The Booster compressor is a device that compresses the following: a) the low pressure recycle coming from the LPS (Low pressure Separator), and b) optionally, the recycled compressor packing leaks, each to the pressure level required at the inlet side of the Primary compressor. This compression can take place in one or multiple compression stages, and can be combined with intermediate cooling. A Booster compressor can consist of single or multiple compressor frames, and can be potentially combined with Primary compressor frame(s).

The Primary compressor is a device that compresses the following: a) the fresh incoming ethylene, and/or b) the low pressure recycle coming from the Booster compressor, and/or c) the recycled compressor packing leaks, each to the pressure level required at the inlet side of the Hyper compressor. This compression can take place in one or multiple compression stages, and can be combined with intermediate cooling. The Primary compressor can consist of single or multiple compressor frames, and can be potentially combined with Booster compressor frame(s). Hyper compressor, or Secondary compressor, is a device that compresses the following: a) the ethylene coming from the HPR (High Pressure Recycle), and/or b) the Primary compressor, each to a pressure level required to feed the reactor at its inlet pressure set point.

This compression can take place in one or multiple compression stages, and can be combined with intermediate cooling. The Hyper compressor comprises a plunger reciprocating compressor, and can consist of single or multiple compressor frame(s).

The term "separate compression flows," as used herein, refers to ethylene feed flows that are kept separated in two or more flows over the Primary and/or Hyper compressors. During the compression steps, the ethylene feed flows can be kept separated over the parallel operating compression cylinders, or recombined after each compression step.

The term "polymer" refers to a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined infra.

The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" or "ethylene polymer" refers to a polymer that comprises a majority amount of polymerized ethylene, based on the weight of the polymer, and, optionally, may comprise at least one comonomer.

The term "ethylene-based interpolymer" or "ethylene interpolymer" refers to an interpolymer that comprises a majority amount of polymerized ethylene, based on the weight of the interpolymer, and comprises at least one comonomer.

The term "composition," as used herein, includes a mixture of materials which comprise the composition, as well as reaction products and decomposition products formed from the materials of the composition.

The term "CTA system" includes a single CTA, or a mixture of CTAs, added to the polymerization process, typically to control the melt index. A CTA system includes a component able to transfer a hydrogen atom to a growing polymer molecule containing a radical, by which a radical is formed on the CTA molecule, which can then initiate a new polymer chain. CTA is also known as telogen or telomer. In a preferred embodiment of the invention, each CTA system comprises a single CTA.

The term "inlet pressure of high pressure recycle (HPR)" refers to the pressure level in the high pressure separator (HPS).

Test Methods

Density:

Samples for density measurement are prepared according to ASTM D 1928. Samples are pressed at 190° C. and 30,000 psi for three minutes, and then at (21° C.) and 207 MPa for one minute. Measurements are made within one hour of sample pressing, using ASTM D792, Method B.

Melt Index:

Melt index, or $I_2$, (grams/10 minutes) is measured in accordance with ASTM D 1238, Condition 190° C./2.16 kg. $I_{10}$ is measured with ASTM D 1238, Condition 190° C./10 kg.

Melt Strength (MS):

MS is a measure of the extensional viscosity of polymer melts, and it represents the maximum tension that can be applied to the melt, without rupture or tearing of the melt. A capillary viscometer is used to extrude a polymer strand, and the strand is pulled by a pair of rollers, until it ruptures. Melt strength (MS) was measured using a GOETTFERT RHEO-TENS attached to an INSTRON capillary rheometer. The polymer melt was extruded through a capillary, at an aspect ratio (capillary length/capillary radius) of 30, and at a constant plunger velocity. Therefore, the polymer melt was subjected to a constant apparent wall shear rate. The extruded melt was subsequently stretched by a pair of serrated wheels having radii of 19 mm, at a distance (H) from the capillary exit. The rotational speed of the wheels was increased linearly with time, while the draw down force (F) was monitored. The melt strength was reported as the draw down force (cN) measured when the polymer strand broke. The following conditions were used in the melt strength measurement: temperature 220° C., plunger speed 0.2 mm/s, wheel acceleration 6 mm/s$^2$, capillary radius 1 mm, capillary length 30 mm, barrel radius 6 mm, wheel radius 19 mm, and distance (H) 100 mm Triple Detector Gel Permeation Chromatography (TDGPC):

High temperature 3Det-GPC analysis was performed on an Alliance GPCV2000 instrument (Waters Corp.) set at 145° C. The flow rate for the GPC was 1 mL/min. The injection volume was 218.5 µL. The column set consists of four Mixed-A columns (20-µm particles; 7.5×300 mm; Polymer Laboratories Ltd).

Detection was achieved by using an IR4 detector from Polymer ChAR, equipped with a CH-sensor; a Wyatt Technology Dawn DSP MALS detector (Wyatt Technology Corp., Santa Barbara, Calif., USA), equipped with a 30-mW argon-ion laser operating at λ=488 nm; and a Waters three-capillary viscosity detector. The MALS detector was calibrated by measuring the scattering intensity of the TCB solvent. Normalization of the photodiodes was done by injecting SRM 1483, a high density polyethylene with weight-average molecular weight (Mw) of 32,100 and polydispersity of 1.11. A specific refractive index increment (dn/dc) of −0.104 mL/mg, for polyethylene in TCB, was used.

The conventional GPC calibration was done with 20 narrow PS standards (Polymer Laboratories Ltd.) with molecular weights in the range 580-7,500,000 g/mol. The polystyrene standard peak molecular weights were converted to polyethylene molecular weights using $$M_{polyethylene} = A \times (M_{polystyrene})^B$$

with A≈0.39, B=1. The value of A was determined by using HDPE reference, a linear polyethylene homopolymer with Mw of 115,000 g/mol. The HDPE reference material was also used to calibrate the IR detector and viscometer, by assuming 100% mass recovery and an intrinsic viscosity of 1.873 dL/g. Distilled "Baker Analyzed-grade" 1,2,4-trichlorobenzene (J. T. Baker, Deventer, The Netherlands), containing 200 ppm of 2,6-di-tert-butyl-4-methylphenol (Merck, Hohenbrunn, Germany), was used as the solvent for sample preparation, as well as for the 3Det-GPC experiments. HDPE SRM 1483 was obtained from the U.S. National Institute of Standards and Technology (Gaithersburg, Md., USA). LDPE solutions were prepared by dissolving the samples under gentle stirring for three hours at 160° C. The PS standards were dissolved under the same conditions for 30 minutes. The sample concentration for the 3Det-GPC experiments was 1.5 mg/mL, and the polystyrene concentrations were 0.2 mg/mL.

A MALS detector measures the scattered signal from polymers or particles in a sample under different scattering angles θ. The basic light scattering equation (from M. Anderson, B. Wittgren, K.-G. Wahlund, Anal. Chem. 75, 4279 (2003)) can be written as $$\sqrt{\frac{Kc}{R_\theta}} = \sqrt{\frac{1}{M} + \frac{16\pi^2}{3\lambda^2}\frac{1}{M}Rg^2\sin^2\left(\frac{\theta}{2}\right)}, \quad (2)$$

where $R_\theta$ is the excess Rayleigh ratio, K is an optical constant, which is, among other things, dependent on the specific refractive index increment (dn/dc), c is the concentration of the solute, M is the molecular weight, $R_g$ is the radius of gyration, and λ is the wavelength of the incident light. Calculation of the molecular weight and radius of gyration from the light scattering data require extrapolation to zero angle (see also P. J. Wyatt, Anal. Chim Acta 272, 1 (1993)). This is done by plotting $(Kc/R_\theta)^{1/2}$ as a function of $\sin^2(\theta/2)$ in the so-called Debye plot. The molecular weight can be calculated from the intercept with the ordinate, and the radius of gyration from initial slope of the curve. The Zimm and Berry methods are used for all data. The second virial coefficient is assumed to be negligible. The intrinsic viscosity numbers are calculated from both the viscosity and concentration detector signals by taking the ratio of the specific viscosity and the concentration at each elution slice. ASTRA 4.72 (Wyatt Technology Corp.) software is used to collect the signals from the IR detector, the viscometer, and the MALS detector. Data processing is done within house-written Microsoft EXCEL macros.

The calculated molecular weights, and molecular weight distributions are obtained using a light scattering constant derived from one or more of the polyethylene standards mentioned and a refractive index concentration coefficient, dn/dc, of 0.104. Generally, the mass detector response and the light scattering constant should be determined from a linear standard with a molecular weight in excess of about 50,000 Daltons. The viscometer calibration can be accomplished using the methods described by the manufacturer, or alternatively, by using the published values of suitable linear standards, such as Standard Reference Materials (SRM) 1475a, 1482a, 1483, or 1484a. The chromatographic concentrations are assumed low enough to eliminate addressing $2^{nd}$ viral coefficient effects (concentration effects on molecular weight).

Blown Film Fabrication

Blown film fabrication conditions are listed in Table A. The thickness of the blown films was measured by a micrometer.

TABLE A

| Blown Film Fabrication Conditions | |
|---|---|
| Blown film extruder type | Single screw |
| Screw Diameter (mm) | 9 (L/D = 30) |
| Die size (mm) | 30 |
| Parameter | |
| Blow up ratio (BUR) | 2.5 |
| Output (kg/hr) | 1 |
| Film Thickness (micron) | 40 |
| Die Gap (mm) | 1.0 |
| Temperature Profile (° C.) | |
| Barrel 1 | 175 |
| Barrel 2 | 185 |
| Barrel 3 | 200 |
| Die zone | 200 |
| Screw speed (rpm) | 45 |
| Freezing zone (mm) | <5 |
| Film line speed (m/min) | 3.6 |

EXPERIMENTAL

In all polymerization examples (comparative and inventive), propionaldehyde was used as the chain transfer agent.

Comparative Example A1

The polymerization was carried out in tubular reactor with three reaction zones. In each reaction zone, pressurized water was used for cooling and/or heating the reaction medium, by circulating this water through the jacket of the reactor. Each reaction zone had one inlet and one outlet. Each inlet stream consisted of the outlet stream from the previous reaction zone and/or an added ethylene-rich feed stream. The non-converted ethylene, and other gaseous components in the reactor outlet, were recycled through the high pressure and low pressure recycles, and were compressed and distributed through the Booster, Primary and Hyper (Secondary) compressors according flow scheme 1 (see FIG. 1). Organic peroxides were fed into each reaction zone.

After reaching the first peak temperature (maximum temperature) in reaction zone 1, the reaction medium was cooled with the help of pressurized water. At the outlet of the reaction zone 1, the reaction medium was further cooled by injecting a fresh, cold (<120° C.), ethylene-rich feed stream (#20), and the reaction was re-initiated by feeding an organic peroxide. This process was repeated at the end of the second reaction zone to enable further polymerization in the third reaction zone. The weight ratio of the ethylene-rich feed streams to the three reaction zones was 1.00:0.75:0.25. Chain transfer agent present in each reaction zone inlet originated from the low pressure and high pressure recycle flows (#13 and #15), as well as from freshly injected CTA make-up stream #7 and/or stream #6. In this comparative example, the weight ratio between the "CTA make up" streams #7 and #6 was 1.00. In FIGS. 1-7, flow line 11 represents the polymer-rich stream flowing from the HPS (High Pressure Separator) to the LPS (Low Pressure Separator). In FIGS. 1-7, flow line 4 represents the additive flows from line 18, optionally flow line 6, optionally, flow line 2, optionally flow line 3, and feeds into the hyper compressor. In FIGS. 1-7, flow line 19 feeds into flow line 5, and flow line 5 represents the additive flows from line 19, optionally flow line 7, optionally, flow line 2, optionally flow line 3, and feeds into the hyper compressor.

The ethylene flow and CTA distribution are described in Tables 1A and 1B, while further process conditions and derived polymer properties, and film data, are given in Tables 3A and 3B. The R2 and R3 values are each 0.44. The Z1/Z2 and Z1/Z3 values are each 1.24

Inventive Example A2

The polymerization was carried out in tubular reactor with three reaction zones, as discussed above. The non-converted ethylene, and other gaseous components in the reactor outlet, were recycled through Booster the high pressure and low pressure recycles, and were compressed and distributed through the, Primary and Hyper (Secondary) compressors according flow scheme 2 (see FIG. 2).

In each reaction zone, the polymerization was initiated with organic peroxides. After reaching the first peak temperature in reaction zone 1, the reaction medium was cooled down with pressurized water. At the outlet of the first reaction zone, the reaction medium was further cooled by injecting a fresh, cold ethylene-rich feed stream (#20), and the reaction was initiated again by feeding organic peroxide into the reaction zone. This process was repeated at the end of the second reaction zone, to enable further polymerization in the third reaction zone.

The weight ratio of the ethylene-rich feed streams to the three reaction zones was 1.00:0.75:0.25. Chain transfer agent present in each reactor inlet originated from the low and high pressure recycle flows (#13 and #15), as well as from freshly injected CTA make-up stream #7 and/or stream #6. In this inventive example, the weight ratio of the CTA make-up streams #7 and #6 was 0.98. The ethylene flow and the CTA distribution are described in Tables 2A and 2B, while further process conditions and derived polymer properties, and film data, are given in Tables 3A and 3B. The R2 and R3 values are each 2.28. The Z1/Z2 and Z1/Z3 values are each 0.81.

Comparative Example A0

The polymerization was run according description for Comparative Example A1 above, with the following changes. In this comparative example, the weight ratio of the CTA make-up streams #7 and #6 is 2.19. The R2 and R3 values are each 0.44. The Z1/Z2 and Z1/Z3 values are each 1.29.

Comparative Example B1

The polymerization was run according to the above description for Comparative Example A1 with the following changes. In this comparative example, the weight ratio of the CTA make up streams #7 and #6 is 9.5. The R2 and R3 values are each 0.44. The Z1/Z2 and Z1/Z3 values are each 1.35.

Inventive Example B2

The polymerization was run according to the above description for Inventive Example A2 with the following changes. In this inventive example, the weight ratio of the CTA make up streams #7 and #6 is 0.17. The R2 and R3 values are each 2.28. The Z1/Z2 and Z1/Z3 values are each 0.75. As discussed above, the summaries of the polymerization conditions are listed in Tables 1A, 1B, 2A, 2B and 3A. Polymer properties and film data, are listed in Table 3B.

Calculation of CTA Make-Up Level

Table 4A is used to calculate the CTA make-up levels in Tables 1B and 2B (make-up level of propionaldehyde). Table 4 provides Cs values as measured by Mortimer (see references 1-5 noted below Table 4A). The values in bold italics are the calculated Cs values based on the activation energy and the activation volume (Mortimer data). These Cs values are calculated at the average conditions of the tubular polymerizations.

TABLE 4A

Cs Values

| Transfer agent | Temperature, ° C. | Pressure, atm. | Cs |
|---|---|---|---|
| Propionaldehyde | 130 | 1360 | 0.33 |
| ($T_{bp}$ = 49° C.) | 200 | 1360 | 0.283 |
| | 130 | 2380 | 0.23 |
| | *245* | *2300* | *0.17* |
| Acetone | 130 | 1360 | 0.0168 |
| ($T_{bp}$ = 56° C.) | 200 | 1360 | 0.0282 |
| | 130 | 2380 | 0.048 |
| | *245* | *2300* | *0.08* |

1. G. Mortimer; Journal of Polymer Science: Part A-1; Chain transfer in ethylene polymerization; vol 4, p 881-900 (1966).
2. G. Mortimer; Journal of Polymer Science: Part A-1; Chain transfer in ethylene polymerization. Part IV. Additional study at 1360 atm and 130° C.; vol 8, p1513-1523 (1970).
3. G. Mortimer; Journal of Polymer Science: Part A-1; Chain transfer in ethylene polymerization. Part V. The effect of temperature; vol 8, p1535-1542 (1970).
4. G. Mortimer; Journal of Polymer Science: Part A-1; Chain transfer in ethylene polymerization. Part V. The effect of pressure; vol 8, p1543-1548 (1970).
5. G. Mortimer; Journal of Polymer Science: Part A-1; Chain transfer in ethylene polymerization VII. Very reactive and depletable transfer agents; vol 10, p 163-168 (1972).

CTA Conversion and Losses

CTA conversion level in reactor=Ethylene conversion*Cs; and Ethylene conversion level=28.85%

CTA conversion level in reactor: Propionaldehyde: 4.9%; and Acetone: 1.4%

Additional losses of chain transfer agent are through purge gas (0.22%), residual CTA in polymer, and by condensation in the Booster compressor section. The last two losses are a function of the vapor pressure of the component.

These additional losses were calculated by ASPEN and totalize to: Propionaldehyde: 0.5%; and Acetone: 1%. ASPEN stands for AspenTech process simulation software (available from AspenTech).

The following process parameters have been estimated with ASPEN: the distribution of the CTA over the high pressure and low pressure recycles, loss of CTA as residual in the polymer, and condensation of CTA in the Booster compressor, and condensation of the hydrocarbon solvent used as the peroxide diluent, in the Booster compressor.

The estimates for the total loss per process pass (including reactor conversion) are given as: Propionaldehyde: 5.4%; and Acetone: 2.4%.

Furthermore, ASPEN predicts that the concentration of propionaldehyde in the low pressure recycle (LPR) is twice as high than the concentration of propionaldehyde in the high pressure recycle (HPR).

Alternative Flow Schemes—Effects of Fresh Ethylene Distribution on CTA Distribution in the Reactor Tables 5-8 provides a comparison of the fresh ethylene and CTA distribution results for the different flow schemes shown in FIGS. 1-7.

Table 9 shows the distribution for non-ethylene components over the reactor feed streams. Where non-ethylene components consist typically of added components like methane, ethane, CTA, solvent, etc., and/or formed components, like peroxide dissociation products, such as, for example, tert-butanol, acetone and CO2. Due to the low purge rate and their low conversions, these components will accumulate, and can drive the ethylene content below 97 wt %. The build-up of these impurities, found in recycled ethylene stream(s), will affect the polymerization process by lowering the ethylene concentration, and introducing components showing chain transfer activity. The overall impact, the lowering of the ethylene concentration and the chain transfer activity of some of the components, is similar to the result obtained using a CTA system. Table 9 shows the impact of the distribution of fresh ethylene for purity levels of 97 wt % and 99.8 wt % of the recycled and fresh ethylene, respectively, on the ethylene content in the feed streams.

TABLE 1A

Ethylene distribution for comparative, A0, A1 and B1

| Flow scheme | | | | | Comparative | | |
|---|---|---|---|---|---|---|---|
| Stream description 1 and 2 | stream # | unit | Calculation formula | | A0 | A1 | B1 |
| Total Ethylene throughput | A | MT/hr | as measured | | 56.1 | 56.0 | 56.1 |
| Ethylene conversion | B | wt % | as measured | | 28.9% | 29.1% | 29.0% |
| Ethylene in HPS-bottom outlet | C | wt % | estimated | | 20% | 20% | 20% |
| Purge-gas rate | #16 | MT/hr | as measured | | 0.1 | 0.1 | 0.1 |
| Polymer-output | #12 | MT/hr | =A*B | | 16.2 | 16.3 | 16.3 |
| Fresh ethylene-make-up | #1 | MT/hr | =#12 + #16 | | 16.3 | 16.4 | 16.4 |
| Ethylene at reactor outlet | #10 | MT/hr | =A*(1 − B) | | 39.9 | 39.7 | 39.8 |
| Low pressure recycle (Booster-inlet) | #13 | MT/hr | =C/(1 − C)*#12 | | 4.06 | 4.07 | 4.07 |
| HPR-flow | #15 | MT/hr | =A − #12 − #13 | | 35.9 | 35.6 | 35.8 |
| Primary B, total flow | #3 | MT/hr | =(#1 + #13)/2 | | 10.2 | 10.2 | 10.2 |
| Primary B, fresh Ethylene in #3 | #3(FE) | MT/hr | =#1/2 | | 8.16 | 8.20 | 8.19 |
| Primary A, total flow | #2 | MT/hr | =(#1 + #13)/2 | | 10.2 | 10.2 | 10.2 |
| Primary A, fresh Ethylene in #2 | #2(FE) | MT/hr | =#1/2 | | 8.16 | 8.20 | 8.19 |
| HPR + Primary A, total flow | #18 | MT/hr | =#15 + #2 − #16 | | 45.9 | 45.8 | 45.9 |
| HPR + Primary A, Fresh ethylene | #18(FE) | MT/hr | =#2(FE) | | 8.16 | 8.20 | 8.19 |
| Hyper flow front | #9 | MT/hr | A/2 | | 28.1 | 28.0 | 28.1 |
| Hyper front fresh ethylene in #9 | #9(FE) | MT/hr | =#9/#18*#18(FE) | | 5.0 | 5.0 | 5.0 |
| Hyper flow side | #8 | MT/hr | =A/2 | | 28.1 | 28.0 | 28.1 |
| Hyper side fresh ethylene in #8 | #8(FE) | MT/hr | =#3(FE) + (#8 − #3)/#18*#18(FE) | | 11.3 | 11.4 | 11.4 |
| RX-1: Total Ethyl.-flow | #9 | MT/hr | =#9 | | 28.1 | 28.0 | 28.1 |
| RX-1: Fresh-Ethylene flow in #9 | #9(FE) | MT/hr | =#9(FE) | | 5.0 | 5.0 | 5.0 |
| RZ-1: Fresh-Ethylene/total Ethylene ratio | I | wt fraction | =#9(FE)/#9 | | 0.178 | 0.179 | 0.178 |
| RX-2: Total Ethyl.-flow | #20 (75% of #8) | MT/hr | =0.75*#8 | | 21.1 | 21.0 | 21.0 |
| RX-2: Fresh-Ethylene flow in #20 | #20(FE) | MT/hr | =0.75*#8(FE) | | 8.5 | 8.5 | 8.5 |
| RZ-2: Fresh-Ethylene/total Ethylene | L | wt fraction | =#8(FE)/#8 | | 0.40 | 0.41 | 0.41 |
| R2-value (RZ1/RZ2) | M | | =I/L | | 0.44 | 0.44 | 0.44 |
| RX-3, total Ethyl.-flow | #21 (25% of #8) | MT/hr | =0.25*#8 | | 7.0 | 7.0 | 7.0 |
| RX-3, Fresh-Ethylene flow in #21 | #21(FE) | MT/hr | =0.25*#8(FE) | | 2.8 | 2.8 | 2.8 |
| RZ-3, Fresh-Ethylene/total Ethylene ratio | O | | =#8(FE)/#8 | | 0.40 | 0.41 | 0.41 |
| R3-value (RZ1/RZ3) | P | | =I/O | | 0.44 | 0.44 | 0.44 |

TABLE 1B

CTA distribution for comparative, A0, A1 and B1

| Flow scheme | | | | | Comparative | | |
|---|---|---|---|---|---|---|---|
| Stream description 1 and 2 | stream # | unit | Calculation formula | | A0 | A1 | B1 |
| CTA-conversion | R | wt % | by Mortimer and ASPEN | | 5.4% | 5.4% | 5.4% |
| CTA flow front | #7 | kg/hr | =#7 (measured) | | 14.0 | 10.5 | 18.0 |
| CTA flow side | #6 | kg/hr | =#6 (measured) | | 6.4 | 10.5 | 1.9 |
| CTA-total | S | kg/hr | =(#6 + #7)/R | | 377.8 | 388.9 | 368.5 |
| CTA-reactor outlet | #10(CTA) | kg/hr | =S*(1 − R) + #16(CTA) + #12(CTA) + #14 | | 359.8 | 370.3 | 351.0 |
| CTA in Purge gas | #16(CTA) | kg/hr | Calculated | | 0.9 | 0.9 | 0.9 |
| Conc. of CTA in HPR-inlet | factor X | kg CTA/MT Eth | $X^a$ | | 8.178 | 8.457 | 7.989 |
| Conc. of CTA in LPR-inlet | | kg CTA/MT Eth | $2X^a$ | | 16.356 | 16.914 | 15.978 |
| CTA-LPR-inlet | #13(CTA) | kg/hr | =#13*$2X^a$ | | 66.3 | 68.9 | 65.0 |
| CTA in HPR-inlet | #15(CTA) | kg/hr | =#15*$X^a$ | | 293.3 | 301.3 | 285.8 |
| CTA loss in extrusion | #12(CTA) | kg/hr | ASPEN | | 0.16 | 0.17 | 0.16 |
| Check on X-factor$^a$ | | | =(#13(CTA) + #15(CTA) + #12(CTA))/#10(CTA) | | 1.000 | 1.000 | 1.000 |
| CTA in HPR-outlet | #17(CTA) | kg/hr | =#15(CTA) − #16(CTA) | | 292.4 | 300.4 | 284.9 |
| CTA condensed in LPR | #14 | kg/hr | ASPEN | | 1.34 | 1.37 | 1.30 |
| CTA in Primary A | #2(CTA) | kg/hr | =(#13(CTA) − #12(CTA) − #14)/2 | | 32.42 | 33.68 | 31.77 |
| CTA in Primary B | #3(CTA) | kg/hr | =(#13(CTA) − #12(CTA) − #14)/2 | | 32.42 | 33.68 | 31.77 |
| CTA in HPR + Primary A | #18(CTA) | kg/hr | =#17(CTA) + #2(CTA) | | 324.8 | 334.1 | 316.7 |
| CTA in Hyper flow front | #9(CTA) | kg/hr | =#9/#18*#18(CTA) + #7 | | 212.4 | 214.9 | 211.6 |
| CTA in Hyper flow side | #8(CTA) | kg/hr | =#3(CTA) + (#8 − #3)/#18*#18(CTA) + #6 | | 165.2 | 173.8 | 156.8 |
| relative CTA conc. in #9 | $Z1^b$ | gr CTA/kg Ethylene | =#9(CTA)/#9 | | 7.57 | 7.68 | 7.54 |

TABLE 1B-continued

CTA distribution for comparative, A0, A1 and B1

| Flow scheme Stream description 1 and 2 | stream # | unit | Calculation formula | Comparative A0 | A1 | B1 |
|---|---|---|---|---|---|---|
| relative CTA conc. in #8 | $Z2 = Z3^b$ | gr CTA/kg Ethylene | =#8(CTA)/#8 | 5.89 | 6.21 | 5.59 |
| Z1/Z2 = Z1/Z3 | $Z1/Z2 = Z1/Z3^b$ | | =Z1/Z2 = Z1/Z3 | 1.29 | 1.24 | 1.35 |

[a] Derivation of X-value: Aspen predicts that propionaldehyde (PA) is distributed in the HPS with a concentration gradient of 2 over the LPR and HPR recycle flows (different CTA's will lead to different distribution gradients). This derivation also applies to the X-values listed in Tables 2B, 5B, 6B, 7B and 8B.
Parameter X is defined as concentration parameter for the HPR and is expressed as kg PA per MT ethylene.
The amount of PA in the HPR inlet is calculated by: X*#15; The amount of PA in LPR inlet is calculated by:=2X*#13
Loss of CTA through polymer is: =#12(CTA)
At the correct value for X the ratio between (X*#15 + 2X*#13 + #12(CTA)/#10(CTA) is 1.
[b] For further information on Z1/Zn ratios see WO 2011/075465 and PCT/US11/052525. Also applies to ratios listed in Tables 2B, 5B, 6B, 7B and 8B.

TABLE 2A

Ethylene distribution for inventive A2 and B2

| Flow scheme Stream description 1 and 2 | stream # | unit | Inventive Calculation formula | A2 | B2 |
|---|---|---|---|---|---|
| Total Ethylene throughput | A | MT/hr | as measured | 55.8 | 56.0 |
| Ethylene conversion | B | wt % | as measured | 28.8% | 28.8% |
| Ethylene in HPS-bottom outlet | C | wt % | estimated | 20% | 20% |
| Purge-gas rate | #16 | MT/hr | as measured | 0.1 | 0.1 |
| Polymer-output | #12 | MT/hr | =A * B | 16.1 | 16.1 |
| Fresh ethylene-make-up | #1 | MT/hr | =#12 + #16 | 16.2 | 16.2 |
| Ethylene at reactor outlet | #10 | MT/hr | =A * (1 − B) | 39.7 | 39.8 |
| Low pressure recycle (Booster-inlet) | #13 | MT/hr | =C/(1 − C) * #12 | 4.02 | 4.03 |
| HPR-flow | #15 | MT/hr | =A − #12 − #13 | 35.7 | 35.8 |
| Primary B, total flow | #3 | MT/hr | =(#1 + #13)/2 | 10.1 | 10.1 |
| Primary B, fresh Ethylene in #3 | #3(FE) | MT/hr | =#1/2 | 8.08 | 8.11 |
| Primary A, total flow | #2 | MT/hr | =(#1 + #13)/2 | 10.1 | 10.1 |
| Primary A, fresh Ethylene in #2 | #2(FE) | MT/hr | =#1/2 | 8.08 | 8.11 |
| HPR + Primary A, total flow | #18 | MT/hr | =#15 + #2 − #16 | 45.7 | 45.8 |
| HPR + Primary A, Fresh ethylene | #18(FE) | MT/hr | =#2(FE) | 8.08 | 8.11 |
| Hyper flow front | #9 | MT/hr | A/2 | 27.9 | 28.0 |
| Hyper front fresh ethylene in# 9 | #9(FE) | MT/hr | =#3(FE) + (#9 − #8)/#18 * #18(FE) | 11.2 | 11.3 |
| Hyper flow side | #8 | MT/hr | =A/2 | 27.9 | 28.0 |
| Hyper side fresh ethylene in #8 | #8(FE) | MT/hr | =#8/#18 * #18(FE) | 4.9 | 4.9 |
| RX-1: Total Ethyl.-flow | #9 | MT/hr | =#9 | 27.9 | 28.0 |
| RX-1: Fresh-Ethylene flow in #9 | #9(FE) | MT/hr | =#9(FE) | 11.2 | 11.3 |
| RZ-1: Fresh-Ethylene/total Ethylene ratio | I | wt fraction | =#9(FE)/#9 | 0.403 | 0.403 |
| RX-2: Total Ethyl.-flow | #20 (75% of #8) | MT/hr | =0.75 * #8 | 20.9 | 21.0 |
| RX-2: Fresh-Ethylene flow in #20 | #20(FE) | MT/hr | =0.75 * #8(FE) | 3.7 | 3.7 |
| RZ-2: Fresh-Ethylene/total Ethylene | L | wt fraction | =#8(FE)/#8 | 0.18 | 0.18 |
| R2-value (RZ1/RZ2) | M | | =I/L | 2.28 | 2.28 |
| RX-3, total Ethyl.-flow | #21 (25% of #8) | MT/hr | =0.25 * #8 | 7.0 | 7.0 |
| RX-3, Fresh-Ethylene flow in #21 | #21(FE) | MT/hr | =0.25 * #8(FE) | 1.2 | 1.2 |
| RZ-3, Fresh-Ethylene/total Ethylene ratio | O | | =#8(FE)/#8 | 0.18 | 0.18 |
| R3-value (RZ1/RZ3) | P | | =I/O | 2.28 | 2.28 |

TABLE 2B

CTA distribution for inventive A2 and B2

| Flow scheme Stream description 1 and 2 | stream # | unit | Inventive Calculation formula | A2 | B2 |
|---|---|---|---|---|---|
| CTA-conversion | R | wt % | by Mortimer and ASPEN | 5.4% | 5.4% |
| CTA flow front | #7 | kg/hr | =#7 (measured) | 10.8 | 3.3 |
| CTA flow side | #6 | kg/hr | =#6 (measured) | 11.0 | 19.7 |
| CTA-total | S | kg/hr | =(#6 + #7)/R | 403.7 | 425.9 |
| CTA-reactor outlet | #10(CTA) | kg/hr | =S * (1 − R) + #16(CTA) + #12(CTA) + #14 | 384.5 | 405.6 |
| CTA in Purge gas | #16(CTA) | kg/hr | Calculated | 1.0 | 1.0 |
| Conc. of CTA in HPR-inlet | factor X | kg CTA/MT Eth | X | 8.786 | 9.242 |
| Conc. of CTA in LPR-inlet | | kg CTA/MT Eth | 2X | 17.572 | 18.484 |
| CTA-LPR-inlet | #13(CTA) | kg/hr | =#13 * 2X | 70.6 | 74.5 |
| CTA in HPR-inlet | #15(CTA) | kg/hr | =#15 * X | 313.7 | 330.9 |
| CTA loss in extrusion | #12(CTA) | kg/hr | ASPEN | 0.17 | 0.18 |
| Check on X-factor | | | =(#13(CTA) + #15(CTA) + #12(CTA))/#10(CTA) | 1.000 | 1.000 |
| CTA in HPR-outlet | #17(CTA) | kg/hr | =#15(CTA) − #16(CTA) | 312.7 | 330.0 |
| CTA condensed in LPR | #14 | kg/hr | ASPEN | 1.43 | 1.51 |
| CTA in Primary A | #2(CTA) | kg/hr | =(#13(CTA) − #12(CTA) − #14)/2 | 34.49 | 36.39 |

TABLE 2B-continued

CTA distribution for inventive A2 and B2

| Flow scheme Stream description 1 and 2 | stream # | unit | Inventive Calculation formula | A2 | B2 |
|---|---|---|---|---|---|
| CTA in Primary B | #3(CTA) | kg/hr | =(#13(CTA) − #12(CTA) − #14)/2 | 34.49 | 36.39 |
| CTA in HPR + Primary A | #18(CTA) | kg/hr | =#17(CTA) + #2(CTA) | 347.2 | 366.4 |
| CTA in Hyper flow front | #9(CTA) | kg/hr | =#3(CTA) + (#9 − #3)/#18 * #18(CTA) + #7 | 180.6 | 182.4 |
| CTA in Hyper flow side | #8(CTA) | kg/hr | =#8/#18 * #18(CTA) + #6 | 223.0 | 243.3 |
| relative CTA conc. in #9 | Z1 | gr CTA/kg Ethylene | =#9(CTA)/#9 | 6.47 | 6.52 |
| relative CTA conc. in #8 | Z2 = Z3 | gr CTA/kg Ethylene | =#8(CTA)/#8 | 7.99 | 8.70 |
| Z1/Z2 = Z1/Z3 | Z1/Z2 = Z1/Z3 | | =Z1/Z2 = Z1/Z3 | 0.81 | 0.75 |

TABLE 3A

Process conditions and calculated oxygen content at reaction zone inlets

| | unit | Comp. A0 | Comp. A1 | Comp. B1 | Inven. A2 | Inven. B2 |
|---|---|---|---|---|---|---|
| Reactor inlet pressure | bar | 2322 | 2327 | 2324 | 2326 | 2321 |
| Start temperature RX-1 | °C. | 151 | 150 | 151 | 151 | 151 |
| Re-initiation temperature RX-2 | °C. | 148 | 148 | 148 | 148 | 149 |
| Re-init. Temperature RX-3 | °C. | 219 | 219 | 220 | 221 | 222 |
| Peak-temperature RX-1 | °C. | 305 | 305 | 304 | 304 | 303 |
| Peak-temperature RX-2 | °C. | 303 | 303 | 303 | 303 | 303 |
| Peak-temperature RX-3 | °C. | 303 | 303 | 303 | 302 | 303 |
| HP-R inlet pressure (HPS) | bar | 260 | 265 | 262 | 266 | 268 |
| Organic peroxide used | | TBPO/DTBP | TBPO/DTBP | TBPO/DTBP | TBPO/DTBP | TBPO/DTBP |
| Oxygen content in fresh ethylene* | volume ppm | ≤0.3 | ≤0.3 | ≤0.3 | ≤0.3 | ≤0.3 |
| RX-1: Fresh-Ethylene flow | MT/hr | 5 | 5 | 5 | 11.2 | 11.3 |
| RX-1: Total mass flow | MT/hr | 28.1 | 28 | 28.1 | 27.9 | 28 |
| RX-1: Oxygen content at inlet | wt ppm | ≤0.06 | ≤0.06 | ≤0.06 | ≤0.14 | ≤0.14 |
| RX-2: Fresh-Ethylene flow | MT/hr | 8.5 | 8.5 | 8.5 | 3.7 | 3.7 |
| RX-2: Total mass flow | MT/hr | 49.2 | 49 | 49.1 | 48.8 | 48.3 |
| RX-2: Oxygen content at inlet | wt ppm | ≤0.06 | ≤0.06 | ≤0.06 | ≤0.03 | ≤0.03 |
| RX-3: Fresh ethylene flow | MT/hr | 2.8 | 2.8 | 2.8 | 1.2 | 1.2 |
| RX-3: Total mass flow | MT/hr | 56.1 | 56 | 56.1 | 55.8 | 56 |
| RX-3: Oxygen content at inlet | wt ppm | ≤0.02 | ≤0.02 | ≤0.01 | ≤0.01 | ≤0.01 |
| Calculation for maximum oxygen content of 5.7 wt ppm in supplied ethylene** | | | | | | |
| RX-1: Maximum oxygen content at inlet** | wt ppm | ≤1.0 | ≤1.0 | ≤1.0 | ≤2.3 | ≤2.3 |
| RX-2: Maximum oxygen content at inlet** | wt ppm | ≤1.0 | ≤1.0 | ≤1.0 | ≤0.4 | ≤0.4 |
| RX-3: Maximum oxygen content at inlet** | wt ppm | ≤0.3 | ≤0.3 | ≤0.3 | ≤0.12 | ≤0.12 |

*Oxygen content in supply of ethylene as monitor and measured by the ethylene supplier (on-line data, measured in volume ppm based on gas composition of supplied ethylene). A "0.3 volume ppm" is equal to "0.34 wt ppm (based on gas composition of supplied ethylene)).
**The maximum oxygen content allowed in the supply ethylene specification is 5 volume ppm is equal to 5.7 wt ppm.
Start temperature RX-1: Temperature at which the reaction is started by feeding radical generating initiators
Peak-temperature: Highest temperature within a reaction zone, which is cooled with pressurized water
Re-initiation temperature: Temperature at which the reaction is re-initiated by feeding radical generating initiators. The re-initiation temperature is a function of the outlet temperature of previous reaction zone and the temperature and the amount of optional added feed stream
TBPO: tert-Butyl peroxy-2-ethylhexanoate (organic peroxide)
DTBP: Di-tert-butyl peroxide (organic peroxide)

TABLE 3B

Polymer and Film Properties

| | unit | Comp. A0 | Comp. A1 | Comp. B1 | Invention A2 | Invention B2 |
|---|---|---|---|---|---|---|
| Melt index | g/10 min | 0,73 | 0,73 | 0,71 | 0,70 | 0,69 |
| Density | g/cm³ | 0.9237 | 0.9235 | 0.9234 | 0.9230 | 0.9234 |
| MWD calculated as Mw(abs.)/Mn(conv.) | | 8.49 | 8.48 | 8.29 | 8.94 | 9.45 |
| Melt strength (MS), 220° C. | cN | 8.7 | 8.9 | 8.7 | 9.6 | 10.3 |
| Melt strength-corrected (MS-corr) for MI = 0.75, 220° C. | cN | 8.5 | 8.7 | 8.2 | 8.9 | 9.5 |
| Film gloss (60°) | % | 82.3 | 79.5 | 81.9 | 72.8 | 68.5 |
| Film gloss (20°) | % | 36.3 | 28.4 | 34.0 | 23.9 | 20.3 |
| Film haze (external + internal) | % | 8.9 | 10.0 | 9.0 | 11.0 | 12.4 |
| R2, R3-value | | 0.44 | 0.44 | 0.44 | 2.28 | 2.28 |

TABLE 3B-continued

Polymer and Film Properties

|  | unit | Comp. A0 | Comp. A1 | Comp. B1 | Invention A2 | Invention B2 |
|---|---|---|---|---|---|---|
| Z1/Z2 (=Z1/Z3) |  | 1.29 | 1.24 | 1.35 | 0.81 | 0.75 |
| log(Z1/Z2) |  | 0.11 | 0.09 | 0.13 | −0.09 | −0.13 |

Melt strength-corrected: Melt strength (MS) is corrected for offset from melt-index target. Correction is done through inverse linear relationship. For instance measured MS = 7.5.
Measured melt-index is 0.8, while target melt-index is 0.75.
MS-corrected = $MS_{measured} * MI_{measured}/MI_{target}$ = 7.5*0.8/0.75 = 8
Mw(abs.): Weight average molecular weight measured by absolute GPC
Mn(conv.): Number average molecular weight measured by conventional GPC
Overall-haze: Overall haze includes external and internal haze and as measured according to ASTM D 1003.
Haze-external: Haze effect caused by surface effects (external haze = overall haze − internal haze)
Haze-internal: Haze effect caused by internal polymer in the film and is among others influenced by polymer crystallinity (internal haze is measured by disposing film in transparent fluid (ASTM D 1003))
Gloss (60°): Gloss measured under a 60° angle (ASTM D 2457 and D 523)

TABLE 5A

Calculation of R-value for flow scheme 1 comparative and flow scheme 2 inventive

| Flow scheme | | | 1 comparative | | 2 inventive | |
|---|---|---|---|---|---|---|
| Stream description 1 and 2 | stream # | unit | Calculation formula and outcome | | Calculation formula and outcome | |
| Total Ethylene throughput | A | MT/hr | chosen | 56.0 | chosen | 56.0 |
| Ethylene conversion | B | wt % | chosen | 30.0% | chosen | 30.0% |
| Ethylene in HPS-bottom outlet | C | wt % | estimated | 20% | estimated | 20% |
| Purge-gas rate | #16 | MT/hr | as measured | 0.1 | as measured | 0.1 |
| Polymer-output | #12 | MT/hr | =A*B | 16.8 | =A*B | 16.8 |
| Fresh ethylene-make-up | #1 | MT/hr | =#12 + #16 | 16.9 | =#12 + #16 | 16.9 |
| Ethylene at reactor outlet | #10 | MT/hr | =A*(1 − B) | 39.2 | =A*(1 − B) | 39.2 |
| Low pressure recycle (Booster-inlet) | #13 | MT/hr | =C/(1 − C)*#12 | 4.20 | =C/(1 − C)*#12 | 4.20 |
| HPR-flow | #15 | MT/hr | =A − #12 − #13 | 35.0 | =A − #12 − #13 | 35.0 |
| Primary B, total flow | #3 | MT/hr | =(#1 + #13)12 | 10.6 | =(#1 + #13)/2 | 10.6 |
| Primary B, fresh Ethylene in #3 | #3(FE) | MT/hr | =#112 | 8.45 | =#112 | 8.45 |
| Primary A, total flow | #2 | MT/hr | =(#1 + #13)12 | 10.6 | =(#1 + #13)/2 | 10.6 |
| Primary A, fresh Ethylene in #2 | #2(FE) | MT/hr | =#1/2 | 8.45 | =#112 | 8.45 |
| HPR + Primary A, total flow | #18 | MT/hr | =#15 + #2 − #16 | 45.5 | =#15 + #2 − #16 | 45.5 |
| HPR + Primary A, Fresh ethylene | #18(FE) | MT/hr | =#2(FE) | 8.45 | =#2(FE) | 8.45 |
| Hyper flow front | #9 | MT/hr | A/2 | 28.0 | A/2 | 28.0 |
| Hyper front fresh ethylene in #9 | #9(FE) | MT/hr | =#9/#18*#18(FE) | 5.2 | =#3(FE) + (#9 − #8)/#18*#18(FE) | 11.7 |
| Hyper flow side | #8 | MT/hr | =A/2 | 28.0 | =A/2 | 28.0 |
| Hyper side fresh ethylene in #8 | #8(FE) | MT/hr | =#3(FE) + (#8 − #3)/#18*#18(FE) | 11.7 | =#8/#18*#18(FE) | 5.2 |
| RX-1: Total Ethyl.-flow | #9 | MT/hr | =#9 | 28.0 | =#9 | 28.0 |
| RX-1: Fresh-Ethylene flow in #9 | #9(FE) | MT/hr | =#9(FE) | 5.2 | =#9(FE) | 11.7 |
| RZ-1: Fresh-Ethylene/total Ethylene ratio | I | wt fraction | =#9(FE)/#9 | 0.19 | =#9(FE)/#9 | 0.42 |
| RX-2: Total Ethyl.-flow | #20 (75% of #8) | MT/hr | =0.75*#8 | 21.0 | =0.75*#8 | 21.0 |
| RX-2: Fresh-Ethylene flow in #20 | #20(FE) | MT/hr | =0.75*#8(FE) | 8.8 | =0.75*#8(FE) | 3.9 |
| RZ-2: Fresh-Ethylene/total Ethylene | L | wt fraction | =#8(FE)/#8 | 0.42 | =#8(FE)/#8 | 0.19 |
| R2-value (RZ1/RZ2) | M |  | =I/L | 0.45 | =I/L | 2.25 |
| RX-3, total Ethyl.-flow | #21 (25% of #8) | MT/hr | =0.25*#8 | 7.0 | =0.25*#8 | 7.0 |
| RX-3,Fresh-Ethylene flow in #21 | #21(FE) | MT/hr | =0.25*#8(FE) | 2.9 | =0.25*#8(FE) | 1.3 |
| RZ-3, Fresh-Ethylene/total Ethylene ratio | O |  | =#8(FE)/#8 | 0.42 | =#8(FE)/#8 | 0.19 |
| R3-value (RZ1/RZ3) | P |  | =I/O | 0.45 | =I/O | 2.25 |

TABLE 5B

Calculation of Z-values and Z1/Zn ratios for flow scheme 1 comparative and flow scheme 2 inventive

| Flow scheme | | | 1 comparative | | 2 inventive | |
|---|---|---|---|---|---|---|
| Stream description 1 and 2 | stream # | unit | Calculation formula and outcome | | Calculation formula and outcome | |
| CTA-conversion | R | wt % | Chosen | 8.0% | Chosen | 8.0% |
| CTA flow front | #7 | kg/hr | Chosen | 10.5 | Chosen | 10.5 |
| CTA flow side | #6 | kg/hr | Chosen | 10.5 | Chosen | 10.5 |
| CTA-total | S | kg/hr | =(#6 + #7)/R | 262.5 | =(#6 + #7)/R | 262.5 |
| CIA-reactor outlet | #10(CTA) | kg/hr | =S*(1 − R) + #16(CTA) + #12(CTA) + #14 | 243.4 | =S*(1 − R) + #16(CTA) + #12(CTA) + #14 | 243.5 |
| CTA in Purge gas | #16(CTA) | kg/hr | Calculated | 0.9 | Calculated | 1.0 |

TABLE 5B-continued

Calculation of Z-values and Z1/Zn ratios for flow scheme 1 comparative and flow scheme 2 inventive

| Flow scheme | | | 1 comparative | | 2 inventive | |
|---|---|---|---|---|---|---|
| Stream description 1 and 2 | stream # | unit | Calculation formula and outcome | | Calculation formula and outcome | |
| Conc. of CTA in HPR-inlet | factor X | kg CTA/MT Eth | X | 5.605 | X | 5.606 |
| Conc. of CTA in LPR-inlet | | kg CTA/MT Eth | 2X | 11.21 | 2X | 11.212 |
| CTA-LPR-inlet | #13(CTA) | kg/hr | =#13*2X | 47.1 | =#13*2X | 47.1 |
| CTA in HPR-inlet | #15(CTA) | kg/hr | =#15*X | 196.2 | =#15*X | 196.2 |
| CTA loss in extrusion | #12(CTA) | kg/hr | ASPEN | 0.11 | ASPEN | 0.11 |
| Check on X-factor | | | =(#13(CTA) + #15(CTA) + #12(CTA))/#10(CTA) | 1.000 | =(#13(CTA) + #15(CTA) + #12(CTA))/#10(CTA) | 1.000 |
| CTA in HPR-outlet | #17(CTA) | kg/hr | =#15(CTA) − #16(CTA) | 195.3 | =#15(CTA) − #16(CTA) | 195.2 |
| CTA condensed in LPR | #14 | kg/hr | ASPEN | 0.93 | ASPEN | 0.93 |
| CTA in Primary A | #2(CTA) | kg/hr | =(#13(CTA) − #12(CTA) − #14)/2 | 23.02 | =(#13(CTA) − #12(CTA) − #14)/2 | 23.02 |
| CTA in Primary B | #3(CTA) | kg/hr | =(#13(CTA) − #12(CTA) − #14)/2 | 23.02 | =(#13(CTA) − #12(CTA) − #14)/2 | 23.02 |
| CTA in HPR + Primary A | #18(CTA) | kg/hr | =#17(CTA) + #2(CTA) | 218.3 | =#17(CTA) + #2(CTA) | 218.3 |
| CTA in Hyper flow front[1] | #9(CTA) | kg/hr | =#9/#18*#18(CTA) + #7 | 145.0 | =#3(CTA) + (#9 − #3)/#18* #18(CTA) + #7 | 117.3 |
| CTA in Hyper flow side[2] | #8(CTA) | kg/hr | =#3(CTA) + (#8 − #3)/#18*#18(CTA) + #6 | 117.3 | =#8/#18*#18(CTA) + #6 | 145.0 |
| relative CTA conc. in #9 | Z1 | gr CTA/kg Ethylene | =#9(CTA)/#9 | 5.18 | =#9(CTA)/#9 | 4.19 |
| relative CTA conc. in #8 | Z2 = Z3 | gr CTA/kg Ethylene | =#8(CTA)/#8 | 4.19 | =#8(CTA)/#8 | 5.18 |
| Z1/Z2 = Z1/Z3 | Z1/Z2 = Z1/Z3 | | =Z1/Z2 = Z1/Z3 | 1.24 | =Z1/Z2 = Z1/Z3 | 0.81 |

TABLE 6A

Calculation of R-value for flow scheme 3 comparative

| Flow scheme Stream description 3 | stream # | unit | 3 comparative Calculation formula and outcome | |
|---|---|---|---|---|
| Total Ethylene throughput | A | MT/hr | chosen | 56.0 |
| Ethylene conversion | B | wt % | chosen | 30.0% |
| Ethylene in HPS-bottom outlet | C | wt % | estimated | 20% |
| Purge-gas rate | #16 | MT/hr | as measured | 0.1 |
| Polymer-output | #12 | MT/hr | =A * B | 16.8 |
| Fresh ethylene-make-up | #1 | MT/hr | =#12 + #16 | 16.9 |
| Ethylene at reactor outlet | #10 | MT/hr | =A * (1 − B) | 39.2 |
| Low pressure recycle (Booster-inlet) | #13 | MT/hr | =C/(1 − C) * #12 | 4.20 |
| HPR-flow | #15 | MT/hr | =A − #12 − #13 | 35.0 |
| Primary, total flow | #2 | MT/hr | =#1 + #13 | 21.1 |
| Primary, fresh Ethylene in #2 | #2(FE) | MT/hr | =#1 | 16.90 |
| HPR + Primary, total flow | #18 | MT/hr | =#15 + #2 − #16 | 56.0 |
| HPR + Primary, Fresh ethylene | #18(FE) | MT/hr | =#2(FE) | 16.90 |
| Hyper flow front | #9 | MT/hr | A/2 | 28.0 |
| Hyper front fresh ethylene in #9 | #9(FE) | MT/hr | =#9/#18 * #18(FE) | 8.45 |
| Hyper flow side | #8 | MT/hr | =A/2 | 28.0 |
| Hyper side fresh ethylene in #8 | #8(FE) | MT/hr | =#8/#18 * #18(FE) | 8.45 |
| RX-1: Total Ethyl.-flow | #9 | MT/hr | =#9 | 28.0 |
| RX-1: Fresh-Ethylene flow in #9 | #9(FE) | MT/hr | =#9(FE) | 8.45 |
| RZ-1: Fresh-Ethylene/total Ethylene ratio | I | wt fraction | =#9(FE)/#9 | 0.302 |
| RX-2: Total Ethyl.-flow | #20 (75% of #8) | MT/hr | =0.75 * #8 | 21.0 |
| RX-2: Fresh-Ethylene flow in #20 | #20(FE) | MT/hr | =0.75 * #8(FE) | 6.3 |
| RZ-2: Fresh-Ethylene/total Ethylene | L | wt fraction | =#8(FE)/#8 | 0.302 |
| R2-value (RZ1/RZ2) | M | | =I/L | 1.00 |
| RX-3, total Ethyl.-flow | #21 (25% of #8) | MT/hr | =0.25 * #8 | 7.0 |
| RX-3, Fresh-Ethylene flow in #21 | #21(FE) | MT/hr | =0.25 * #8(FE) | 2.1 |
| RZ-3, Fresh-Ethylene/total Ethylene ratio | O | | =#8(FE)/#8 | 0.302 |
| R3-value (RZ1/RZ3) | P | | =I/O | 1.00 |

TABLE 6B

Calculation of Z-values and Z-ratios for flow scheme 3 comparative

| Flow scheme | | | 3 comparative | |
|---|---|---|---|---|
| Stream description 3 | stream # | unit | Calculation formula and outcome | |
| CTA-conversion | R | wt % | Chosen | 8.0% |
| CTA flow front | #7 | kg/hr | Chosen | 10.5 |
| CTA flow side | #6 | kg/hr | Chosen | 10.5 |
| CTA-total | S | kg/hr | =(#6 + #7)/R | 262.5 |
| CTA-reactor outlet | #10(CTA) | kg/hr | = S * (1 − R) + #16(CTA) + #12(CTA) + #14 | 243.4 |
| CTA in Purge gas | #16(CTA) | kg/hr | Calculated | 0.9 |
| Conc. of CTA in HPR-inlet | factor X | kg CTA/MT Eth | X | 5.605 |
| Conc. of CTA in LPR-inlet | | kg CTA/MT Eth | 2X | 11.21 |
| CTA-LPR-inlet | #13(CTA) | kg/hr | =#13 * 2X | 47.1 |
| CTA in HPR-inlet | #15(CTA) | kg/hr | =#15 * X | 196.2 |
| CTA loss in extrusion | #12(CTA) | kg/hr | ASPEN | 0.11 |
| Check on X-factor | | | =(#13(CTA) + #15(CTA) + #12(CTA))/#10(CTA) | 1.000 |
| CTA in HPR-outlet | #17(CTA) | kg/hr | =#15(CTA) − #16(CTA) | 195.3 |
| CTA condensed in LPR | #14 | kg/hr | ASPEN | 0.93 |
| CTA in Primary | #2(CTA) | kg/hr | =#13(CTA) − #12(CTA) − #14 | 46.04 |
| CTA in HPR + Primary | #18(CTA) | kg/hr | =#17(CTA) + #2(CTA) | 241.3 |
| CTA in Hyper flow front[1] | #9(CTA) | kg/hr | =#9/#18 * #18(CTA) + #7 | 131.2 |
| CTA in Hyper flow side[2] | #8(CTA) | kg/hr | =#8/#18 * #18(CTA) + #6 | 131.2 |
| relative CTA conc. in #9 | Z1 | gr CTA/kg Ethylene | =#9(CTA)/#9 | 4.68 |
| relative CTA conc. in #8 | Z2 = Z3 | gr CTA/kg Ethylene | =#8(CTA)/#8 | 4.68 |
| Z1/Z2 = Z1/Z3 | Z1/Z2 = Z1/Z3 | | =Z1/Z2 = Z1/Z3 | 1.00 |

TABLE 7A

Calculation of R value for flow scheme 4 inventive and flow scheme 5 inventive

| Flow scheme | | | 4 inventive | | 5 inventive | |
|---|---|---|---|---|---|---|
| Stream description 4 and 5 | stream # | unit | Calculation formula and outcome | | Calculation formula and outcome | |
| Total Ethylene throughput | A | MT/hr | chosen | 56.0 | chosen | 56.0 |
| Ethylene conversion | B | wt % | chosen | 30.0% | chosen | 30.0% |
| Ethylene in HPS-bottom outlet | C | wt % | estimated | 20% | estimated | 20% |
| Purge-gas rate | #16 | MT/hr | as measured | 0.1 | as measured | 0.1 |
| Polymer-output | #12 | MT/hr | =A*B | 16.8 | =A*B | 16.8 |
| Fresh ethylene-make-up | #1 | MT/hr | =#12 + #16 | 16.9 | =#12 + #16 | 16.9 |
| Ethylene at reactor outlet | #10 | MT/hr | =A*(1 − B) | 39.2 | =A*(1 − B) | 39.2 |
| Low pressure recycle (Booster-inlet) | #13 | MT/hr | =C/(1 − C)*#12 | 4.20 | =C/(1 − C)*#12 | 4.20 |
| HPR-flow | #15 | MT/hr | =A − #12 − #13 | 35.0 | =A − #12 − #13 | 35.0 |
| Primary, total flow | #2 | MT/hr | (#1 + #13 | 21.1 | =#1 + #13 | 21.1 |
| Primary, fresh Ethylene in #2 | #2(FE) | MT/hr | =#1/2 | 16.90 | =#1/2 | 16.90 |
| HPR outlet | #18 | MT/hr | =#15 − #16 | 34.9 | =#15 − #16 | 34.9 |
| HPR, Fresh ethylene | #18(FE) | MT/hr | | 0.00 | | 0.00 |
| Hyper flow front | #9 | MT/hr | A/2 | 28.0 | A/2 | 28.0 |
| Hyper front fresh ethylene in #9 | #9(FE) | MT/hr | =#2(FE) + (#9 − #2)/ #18*#18(FE) | 16.9 | =#9/#18*#18(FE) | 0.0 |
| Hyper flow side | #8 | MT/hr | =A/2 | 28.0 | =A/2 | 28.0 |
| Hyper side fresh ethylene in #8 | #8(FE) | MT/hr | =#8/#18*#18(FE) | 0.0 | =#2(FE) + (#8 − #2)/ #18*#18(FE) | 16.9 |
| RX-1: Total Ethyl.-flow | #9 | MT/hr | =#9 | 28.0 | =#9 | 28.0 |
| RX-1: Fresh-Ethylene flow in #9 | #9(FE) | MT/hr | =#9(FE) | 16.9 | =#9(FE) | 0.0 |
| RZ-1: Fresh-Ethylene/total Ethylene ratio | I | wt fraction | =#9(FE)/#9 | 0.60 | =#9(FE)/#9 | 0.00 |
| RX-2: Total Ethyl.-flow | #20 (75% of #8) | MT/hr | =0.75*#8 | 21.0 | =0.75*#8 | 21.0 |
| RX-2: Fresh-Ethylene flow in #20 | #20(FE) | MT/hr | =0.75*#8(FE) | 0.0 | =0.75*#8(FE) | 12.7 |
| RZ-2: Fresh-Ethylene/total Ethylene | L | wt fraction | =#8(FE)/#8 | 0.00 | =#8(FE)/#8 | 0.60 |
| R2-value (RZ1/RZ2) | M | | =I/L | #DIV/0! | =I/L | 0.00 |
| RX-3, total Ethyl.-flow | #21 (25% of #8) | MT/hr | =0.25*#8 | 7.0 | =0.25*#8 | 7.0 |
| RX-3,Fresh-Ethylene flow in #21 | #21(FE) | MT/hr | =0.25*#8(FE) | 0.0 | =0.25*#8(FE) | 4.2 |
| RZ-3, Fresh-Ethylene/total Ethylene ratio | O | | =#8(FE)/#8 | 0.00 | =#8(FE)/#8 | 0.60 |
| R3-value (RZ1/RZ3) | P | | =I/O | #DIV/0! | =I/O | 0.00 |

TABLE 7B

Calculation of Z-values and Z-ratios for flow scheme 4 inventive and flow scheme 5 inventive

| Flow scheme | | | 4 inventive | | 5 inventive | |
|---|---|---|---|---|---|---|
| Stream description 4 and 5 | stream # | unit | Calculation formula and outcome | | Calculation formula and outcome | |
| CTA-conversion | R | wt % | Chosen | 8.0% | Chosen | 8.0% |
| CTA flow front | #7 | kg/hr | Chosen | 10.5 | Chosen | 10.5 |
| CTA flow side | #6 | kg/hr | Chosen | 10.5 | Chosen | 10.5 |
| CTA-total | S | kg/hr | =(#6 + #7)/R | 262.5 | =(#6 + #7)/R | 262.5 |
| CIA-reactor outlet | #10(CTA) | kg/hr | =S*(1 − R) + #16(CTA) + #12(CTA) + #14 | 243.4 | =S*(1 − R) + #16(CTA) + #12(CTA) + #14 | 243.4 |
| CTA in Purge gas | #16(CTA) | kg/hr | Calculated | 0.9 | Calculated | 0.9 |
| Conc. of CTA in HPR-inlet | factor X | kg CTA/MT Eth | X | 5.605 | X | 5.605 |
| Conc. of CTA in LPR-inlet | | kg CTA/MT Eth | 2X | 11.21 | 2X | 11.21 |
| CTA-LPR-inlet | #13(CTA) | kg/hr | =#13*2X | 47.1 | =#13*2X | 47.1 |
| CTA in HPR-inlet | #15(CTA) | kg/hr | =#15*X | 196.2 | =#15*X | 196.2 |
| CTA loss in extrusion | #12(CTA) | kg/hr | ASPEN | 0.11 | ASPEN | 0.11 |
| Check on X-factor | | | =(#13(CTA) + #15(CTA) + #12(CTA))/#10(CTA) | 1.000 | =(#13(CTA) + #15(CTA) + #12(CTA))/#10(CTA) | 1.000 |
| CTA in HPR-outlet | #17(CTA) | kg/hr | =#15(CTA) − #16(CTA) | 195.3 | =#15(CTA) − #16(CTA) | 195.3 |
| CTA condensed in LPR | #14 | kg/hr | ASPEN | 0.93 | ASPEN | 0.93 |
| CTA in Primary | #2(CTA) | kg/hr | =#13(CTA) − #12(CTA) − #14 | 46.04 | =#13(CTA) − #12(CTA) − #14 | 46.04 |
| CTA in HPR | #18(CTA) | kg/hr | =#17(CTA) | 195.3 | =#17(CTA) | 195.3 |
| CTA in Hyper flow front[1] | #9(CTA) | kg/hr | =#2(CTA) + (#9 − #2)/#18*#17(CTA) + #7 | 95.1 | =#9/#18*#17(CTA) + #7 | 167.2 |
| CTA in Hyper flow side[2] | #8(CTA) | kg/hr | =#8/#18*#17(CTA) + #6 | 167.2 | =#2(CTA) + ( #8 − #2)/#18*#17(CTA) + #6 | 95.1 |
| gr CIA/kg relative CTA conc. in #9 | Z1 | Ethylene | =#9(CTA)/#9 | 3.40 | =#9(CTA)/#9 | 5.97 |
| gr CIA/kg relative CTA conc. in #8 | Z2 = Z3 | Ethylene | =#8(CTA)/#8 | 5.97 | =#8(CTA)/#8 | 3.40 |
| Z1/Z2 = Z1/Z3 | Z1/Z2 = Z1/Z3 | | =Z1/Z2 = Z1/Z3 | 0.57 | =Z1/Z2 = Z1/Z3 | 1.76 |

TABLE 8A

Calculation of R-values for flow scheme 6 inventive and flow scheme 7 inventive

| Flow scheme | | | 6 inventive | | 7 inventive | |
|---|---|---|---|---|---|---|
| Stream description 6 and 7 | stream # | unit | Calculation formula and outcome | | Calculation formula and outcome | |
| Total Ethylene throughput | A | MT/hr | chosen | 56 | chosen | 56 |
| Ethylene conversion | B | wt % | chosen | 30% | chosen | 30% |
| Ethylene in HPS-bottom outlet | C | wt % | estimated | 20.0% | estimated | 20.0% |
| Purge-gas rate | #16 | MT/hr | as measured | 10% | as measured | 10% |
| Polymer-output | #12 | MT/hr | =A*B | 1680% | =A*B | 1680% |
| Fresh ethylene-make-up | #1 | MT/hr | =#12 + #16 | 16.9 | =#12 + #16 | 16.9 |
| Ethylene at reactor outlet | #10 | MT/hr | =A*(1 − B) | 39.2 | =A*(1 − B) | 39.2 |
| Low pressure recycle (Booster-inlet) | #13 | MT/hr | =C/(1 − C)*#12 | 4.2 | =C/(1 − C)*#12 | 4.2 |
| HPR-flow | #15 | MT/hr | =A − #12 − #13 | 35.00 | =A − #12 − #13 | 35.00 |
| Primary B, total flow | #3 | MT/hr | =(#1 + #13)/2 | 10.6 | =(#1 + #13)/2 | 10.6 |
| Primary B, fresh Ethylene in #3 | #3(FE) | MT/hr | =#3 | 10.6 | =#3 | 10.6 |
| Primary A, total flow | #2 | MT/hr | =(#1 + #13)/2 | 10.55 | =(#1 + #13)/2 | 10.55 |
| Primary A, fresh Ethylene in #2 | #2(FE) | MT/hr | =#1 − #3 | 6.4 | =#1 − #3 | 6.4 |
| HPR +Primary A, total flow | #18 | MT/hr | =#15 + #2 − #16 | 45.45 | =#15 + #2 − #16 | 45.45 |
| HPR +Primary A, Fresh ethylene | #18(FE) | MT/hr | =#2(FE) | 6.4 | =#2(FE) | 6.4 |
| Hyper flow front | #9 | MT/hr | A/2 | 28.00 | A/2 | 28.00 |
| Hyper front fresh ethylene in #9 | #9(FE) | MT/hr | =#9/#18*#18(FE) | 3.9 | =#3(FE) + (#9 − #3)/#18*#18(FE) | 13.0 |
| Hyper flow side | #8 | MT/hr | =A/2 | 28.0 | =A/2 | 28.0 |
| Hyper side fresh ethylene in #8 | #8(FE) | MT/hr | =#3(FE) + (#8 − #3)/#18*#18(FE) | 13.0 | =#8/#18*#18(FE) | 3.9 |
| RX-1: Total Ethyl.-flow | #9 | MT/hr | =#9 | 28.0 | =#9 | 28.0 |
| RX-1: Fresh-Ethylene flow in #9 | #9(FE) | MT/hr | =#9(FE) | 3.9 | =#9(FE) | 13.0 |
| RZ-1: Fresh-Ethylene/total Ethylene ratio | I | wt fraction | =#9(FE)/#9 | 0.1 | =#9(FE) #9 | 0.5 |
| RX-2: Total Ethyl.-flow | #20 (75% of #8) | MT/hr | =0.75*#8 | 21.00 | =0.75*#8 | 21.00 |
| RX-2: Fresh-Ethylene flow in #20 | #20(FE) | MT/hr | =0.75*#8(FE) | 9.7 | =0.75*#8(FE) | 2.9 |
| RZ-2: Fresh-Ethylene/total Ethylene | L | wt fraction | =#8(FE)/#8 | 0.5 | =#8(FE)/#8 | 0.1 |
| R2-value (RZ1/RZ2) | M | | =I/L | 0.30 | =I/L | 3.32 |
| RX-3, total Ethyl.-flow | #21 (25% of #8) | MT/hr | =0.25*#8 | 7.00 | =0.25*#8 | 7.00 |
| RX-3,Fresh Ethylene flow in #21 | #21(FE) | MT/hr | =0.25*#8(FE) | 3.2 | =0.25*#8(FE) | 1.0 |
| RZ-3, Fresh-Ethylene/total Ethylene ratio | O | | =#8(FE)/#8 | 0.5 | =#8(FE)/#8 | 0.1 |
| R3-value (RZ1/RZ3) | P | | =I/O | 0.30 | =I/O | 3.32 |

TABLE 8B

Calculation of Z-values and Z-ratios for inventive 6 and inventive 7

| Flow scheme | | | 6 inventive | | 7 inventive | |
|---|---|---|---|---|---|---|
| Stream description 6 and 7 | stream # | unit | Calculation formula and outcome | | Calculation formula and outcome | |
| CTA-conversion | R | wt % | Chosen | 8.0% | Chosen | 8.0% |
| CTA flow front | #7 | kg/hr | Chosen | 10.5 | Chosen | 10.5 |
| CTA flow side | #6 | kg/hr | Chosen | 10.5 | Chosen | 10.5 |
| CTA-total | S | kg/hr | =(#6 + #7)/R | 262.5 | =(#6 + #7)/R | 262.5 |
| CTA-reactor outlet | #10(CTA) | kg/hr | =S*(1 − R) + #16(CTA) + #12(CTA) + #14 | 243.4 | =S*(1 − R) + #16(CTA) + #12(CTA) + #14 | 243.4 |
| CTA in Purge gas | #16(CTA) | kg/hr | Calculated | 0.9 | Calculated | 0.9 |
| Conc. of CTA in HPR-inlet | factor X | kg CTA/MT Eth | X | 5.605 | X | 5.605 |
| Conc. of CTA in LPR-inlet | | kg CTA/MT Eth | 2X | 11.21 | 2X | 11.21 |
| CTA-LPR-inlet | #13(CTA) | kg/hr | =#13*2X | 47.1 | =#13*2X | 47.1 |
| CTA in HPR-inlet | #15(CTA) | kg/hr | =#15*X | 196.2 | =#15*X | 196.2 |
| CTA loss in extrusion | #12(CTA) | kg/hr | ASPEN | 0.11 | ASPEN | 0.11 |
| Check on X-factor | | | =(#13(CTA) + #15(CTA) + #12(CTA))/ #10(CTA) | 1.000 | =(#13(CTA) + #15(CTA) + #12(CTA))/#10(CTA) | 1.000 |
| CTA in HPR-outlet | #17(CTA) | kg/hr | =#15(CTA) − #16(CTA) | 195.3 | =#15(CTA) − #16(CTA) | 195.3 |
| CTA condensed in LPR | #14 | kg/hr | ASPEN | 0.93 | ASPEN | 0.93 |
| CTA in Primary A | #2(CTA) | kg/hr | =#13(CTA) − #12(CTA) − #14 | 46.04 | =#13(CTA) − #12(CTA) − #14 | 46.04 |
| CTA in Primary B | #3(CTA) | kg/hr | | 0.00 | | 0.00 |
| CTA in HPR + Primary A | #18(CTA) | kg/hr | =#17(CTA) + #2(CTA) | 241.3 | =#17(CTA) + #2(CTA) | 241.3 |
| CTA in Hyper flow front[1] | #9(CTA) | kg/hr | =#9/#18*#18(CTA) + #7 | 159.2 | =#3(CTA) + ( #9 − #3)/#18* #18(CTA) + #7 | 103.2 |
| CTA in Hyper flow side[2] | #8(CTA) | kg/hr | =#3(CTA) + (#8 − #3)/#18* #18(CTA) + #6 | 103.2 | =#8/#18*#18(CTA) + #6 | 159.2 |
| relative CTA conc. in #9 | Z1 | gr CTA/kg Ethylene | =#9(CTA)/#9 | 5.68 | =#9(CTA)/#9 | 3.68 |
| relative CTA conc. in #8 | Z2 = Z3 | gr CTA/kg Ethylene | =#8(CTA)/#8 | 3.68 | =#8(CTA)/#8 | 5.68 |
| Z1/Z2 = Z1/Z3 | Z1/Z2 = Z1/Z3 | | =Z1/Z2 = Z1/Z3 | 1.54 | =Z1/Z2 = Z1/Z3 | 0.65 |

TABLE 9

The distribution of non-ethylene components over the reactor feed streams

| Flow scheme Stream description 3 | stream # | unit | Calculation formula and outcome | 3 comp. | 4 invert. | 5 invert. |
|---|---|---|---|---|---|---|
| Total Ethylene throughput | A | MT/hr | chosen | 56.0 | 56.0 | 56.0 |
| Ethylene conversion | B | wt % | chosen | 30.0 | 30.0 | 30.0 |
| Ethylene level in HPR and LPR Recycle ethylene | M | wt % | | 97.0 | 97.0 | 97.0 |
| Ethylene level in Fresh Ethylene | N | wt % | | 99.8 | 99.8 | 99.8 |
| RX-1: Total Ethyl.-flow | #9 | MT/hr | =#9 | 28.0 | 28.0 | 28.0 |
| RX-1: Fresh-Ethylene flow in #9 | #9(FE) | MT/hr | =#9(FE) | 8.45 | 16.9 | 0.0 |
| RZ-1: Fresh-Ethylene/total Ethylene ratio | I | wt fraction | =#9(FE)/#9 | 0.302 | 0.60 | 0.00 |
| Ethylene level in feed to RX-1 | | wt % | =I*0.998 + (1 − I)*0.97 | 97.8 | 98.7 | 97.0 |
| Non-Ethylene components in feed to RX-1 | | wt % | | 2.2 | 1.3 | 3.0 |
| RX-2: Total Ethyl.-flow | #20(75% of #8) | MT/hr | =0.75*#8 | 21.0 | 21.0 | 21.0 |
| RX-2: Fresh-Ethylene flow in #20 | #20(FE) | MT/hr | =0.75*#8(FE) | 6.3 | 0.0 | 12.7 |
| RZ-2: Fresh-Ethylene/total Ethylene | L | wt fraction | =#8(FE)/#8 | 0.302 | 0.00 | 0.60 |
| R2-value (RZ1/RZ2) | M | | =I/L | 1.00 | #DIV/0! | 0.00 |
| Ethylene level in feed to Rx-2 | | wt % | =L*0.998 + (1 − L)*0.97 | 97.8 | 97.0 | 98.7 |
| Non-Ethylene components in feed to RX-2 | | wt % | | 2.2 | 3.0 | 1.3 |
| RX-3, total Ethyl.-flow | #21(25% of #8) | MT/hr | =0.25*#8 | 7.0 | 7.0 | 7.0 |
| RX-3,Fresh-Ethylene flow in #21 | #21(FE) | MT/hr | =0.25*#8(FE) | 2.1 | 0.0 | 4.2 |
| RZ-3, Fresh-Ethylene/total Ethylene ratio | O | wt fraction | =#8(FE)/#8 | 0.302 | 0.00 | 0.60 |
| R3-value (RZ1/RZ3) | P | | =I/O | 1.00 | #DIV/0! | 0.00 |
| Ethylene content in Feed to Rx-3 | | wt % | =O*0.998 + (1 − O)*0.97 | 97.8 | 97.0 | 98.7 |
| Non-Ethylene components in feed to RX-3 | | wt % | | 2.2 | 3.0 | 1.3 |

DIV/0 = infinity

Table 10 lists the CTA activity-ratio at extreme and even "CTA make-up" distributions for different Primary and/or Booster compressor configurations, using a CTA with a make-up level of eight weight percent, as determined by the "total amount of make-up CTA hourly fed to the reactor" divided by the "total amount of CTA hourly fed to the reactor." As seen in Table 10, the Z1/Zn ratio can be widely varied by different flow arrangements, and this variation can be further maximized by the distribution of the make-up CTA.

TABLE 10

Fresh ethylene and CTA distribution calculation results for different flow schemes
Calculations for Ethylene and CTA conversions of respectively 30 and 8 wt %

| Flow scheme | % Primary capacity lined up | Make up CTA distribution | R2 = RZ1/RZ2 R3 = RZ1/RZ3; R2 = R3 | Z1/Z2 value, Z1/Z3 value |
|---|---|---|---|---|
| 1 comparative | 50% Primary directly to Side | 50/50 | 0.45 | 1.24 |
|  |  | 100/0 | 0.45 | 1.46 |
|  |  | 0/100 | 0.45 | 1.05 |
| 2 inventive | 50% Primary directly to Front | 50/50 | 2.25 | 0.81 |
|  |  | 100/0 | 2.25 | 0.95 |
|  |  | 0/100 | 2.25 | 0.69 |
| 3 comparative | Standard line up | 50/50 | 1.00 | 1.00 |
|  |  | 100/0 | 1.00 | 1.17 |
|  |  | 0/100 | 1.00 | 0.85 |
| 4 inventive | 100% Primary to Front | 50/50 | infinity | 0.57 |
|  |  | 100/0 | infinity | 0.67 |
|  |  | 0/100 | infinity | 0.48 |
| 5 inventive | 100% Primary to Side | 50/50 | 0 | 1.76 |
|  |  | 100/0 | 0 | 2.10 |
|  |  | 0/100 | 0 | 1.48 |
| 6 inventive | 50% Primary to Side and Booster to HPR | 50/50 | 0.30 | 1.54 |
|  |  | 100/0 | 0.30 | 1.83 |
|  |  | 0/100 | 0.30 | 1.31 |
| 7 inventive | 50% Primary to Front and Booster to HPR | 50/50 | 3.32 | 0.65 |
|  |  | 100/0 | 3.32 | 0.76 |
|  |  | 0/100 | 3.32 | 0.55 |

Table 11 shows the calculated minimum and maximum Z1/Z2 (=Z1/Z3) ratios for different fresh ethylene distributions for CTA's with different make-up levels (for flow scheme 3 and the combination of flow scheme 4 and 5; where "0" means not applied; and "X" means applied. For ranges in R values see Table 10.

TABLE 11

Ethylene conversion is 30 wt %

| Flow scheme | wt % CTA make up | Fresh ethylene distribution | Make up CTA distribution | Z1/Z2 = Z1/Z3 Minimum value | Maximum value |
|---|---|---|---|---|---|
| 3 | 2 | 0 | X | 0.96 | 1.04 |
| 4&5 | 2 | X | 0 | 0.55 | 1.83 |
| 4&5 | 2 | X | X | 0.52 | 1.92 |
| 3 | 16 | 0 | X | 0.72 | 1.38 |
| 4&5 | 16 | X | 0 | 0.60 | 1.67 |
| 4&5 | 16 | X | X | 0.42 | 2.39 |

As seen in Table 11, if only the distribution of make-up CTA changes, the range of the Z1/Zn varies from "0.96 to 1.04" for a CTA with a low make-up level (2%), and varies from "0.72 to 1.38" for a CTA with a high make-up level (16%). If only the distribution of fresh ethylene changes, the range of the Z1/Zn ratio varies from "0.55 to 1.83" to "0.60 to 1.67" for, respectively, CTAs with a low (2%) and high (16%) make-up levels. If both the distribution of the fresh ethylene and the distribution of the "make-up CTA" changes, the range of the Z1/Zn ratio varies from "0.52 to 1.92" to "0.42 to 2.39," respectively, for CTAs with a low (2%) and high (16%) make-up levels. The data in Table 11 clearly demonstrates that the invention provides for the following: a) a wide range Z1/Zn ratios even for low active CTAs; b) wider ranges for Z1/Zn ratios when fresh ethylene distribution only is applied, as compared to a "make-up CTA" distribution only; and c) unique Z1/Zn ratios for polymerization systems equipped with an ethylene recycle system, when both a fresh ethylene distribution and a "make-up CTA" distribution are applied.

Figure 8:
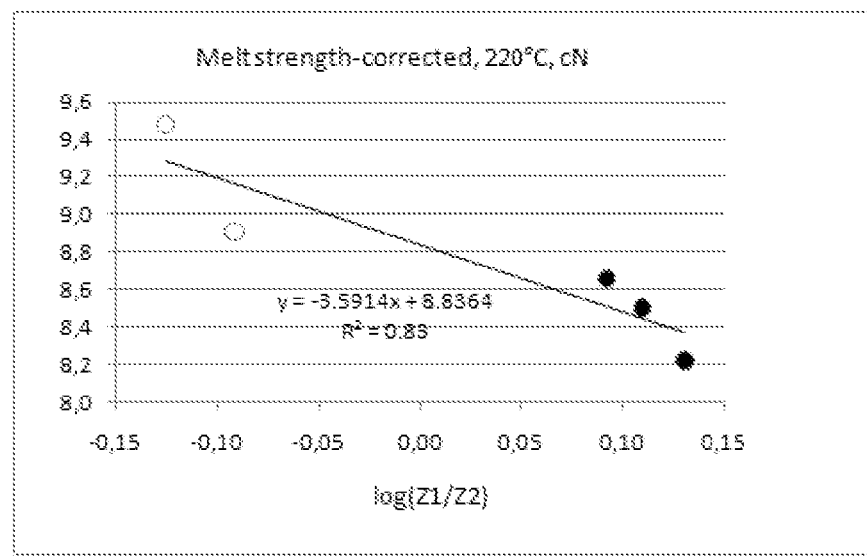
FIG. 8 depicts "corrected melt strength" as a function of log(Z1/Z2).
Figure 9:
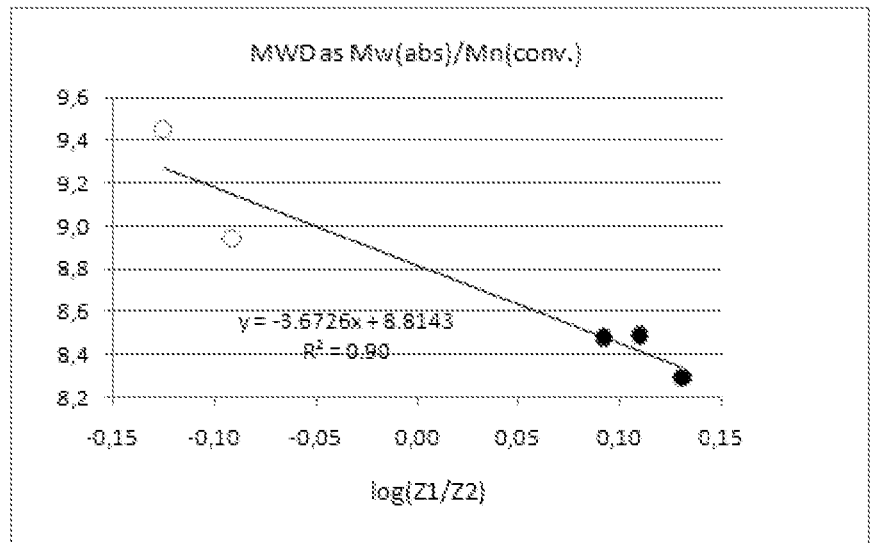
FIG. 9 depicts molecular weight distribution (Mw(abs)/Mn(conv)) as a function of log(Z1/Z2).

In addition, as seen in FIG. 8, the inventive polymerizations (see open circles) allow for polymer with significantly higher melt strength (MS) at lower Z1/Z2 ratios of 0.81 (log (0.81)=−0.09) and 0.75 (log(0.75)=−0.13), as compared to the comparative polymerizations (see closed circles), which formed polymers of lower melt strengths at higher Z1/Z2 ratios of 1.29, 1.24 and 1.35 (respectively, the log data are 0.11, 0.09 and 0.13). Furthermore, Z1/Z2 ratios greater than 1.50 (log(1.50)=0.18), (inventive examples of Table 10 and Table 11) can be used to form polymers with a further reduction in melt strength. As seen in FIG. 9, the inventive polymerizations (see open circles) allow for polymer with significantly broader MWD at lower Z1/Z2 ratios of 0.81 and 0.75, as compared to the comparative polymerizations (see closed circles), which formed polymers with narrower MWD at higher Z1/Z2 ratios of 1.29, 1.24 and 1.35. Furthermore, Z1/Z2 ratios greater than 1.50 (inventive examples of Table 10 and Table 11) can be used to form polymers with a further narrowed MWD.

Figure 10:
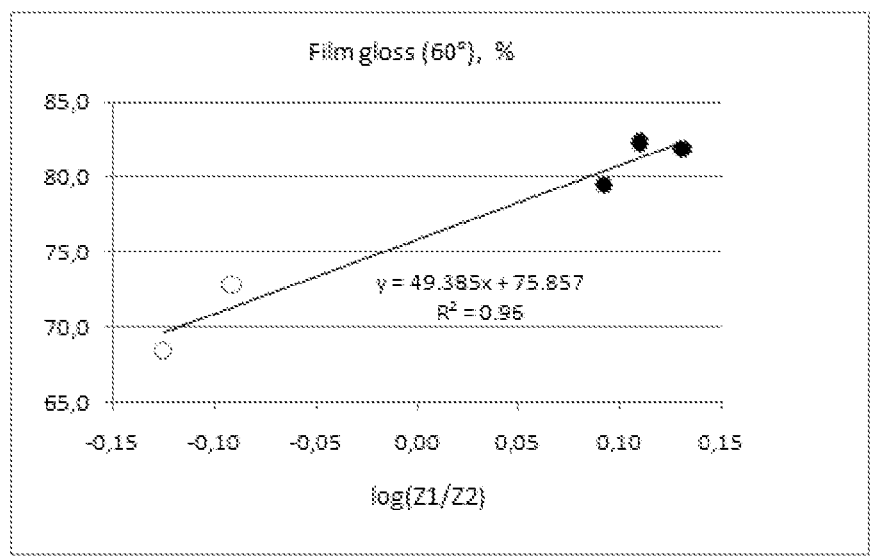
FIG. 10 depicts film gloss as a function of log(Z1/Z2).
Figure 11:
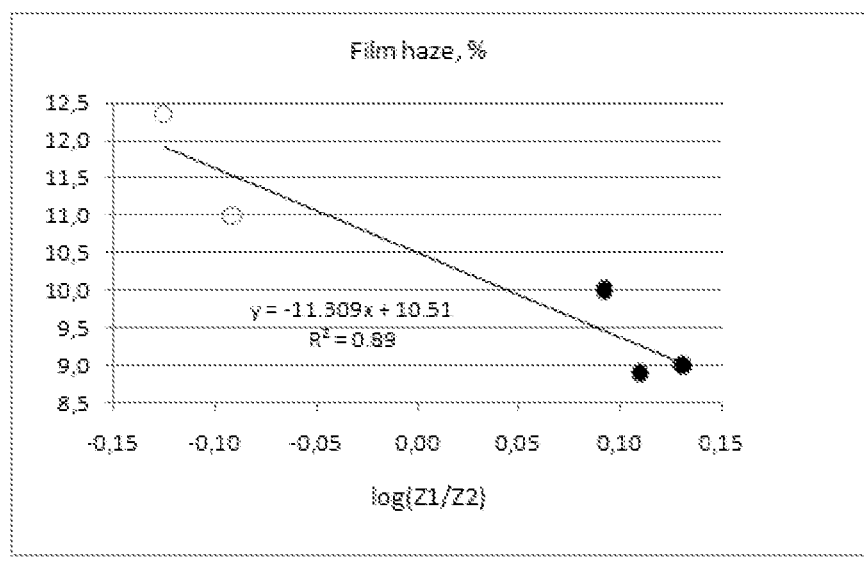
FIG. 11 depicts film haze as a function of log(Z1/Z2).

As seen in FIG. 10, the inventive polymerizations (see open circles) allow for polymer films with significantly lower film gloss at lower Z1/Z2 ratios of 0.81 and 0.75, as compared to the comparative polymerizations (see closed circles), which formed polymer films with higher film gloss at higher Z1/Z2 ratios of 1.29, 1.24 and 1.35. Furthermore, Z1/Z2 ratios greater than 1.50 (inventive examples of Table 10 and Table 11) can be used to form polymer films with a further increase in film gloss. As seen in FIG. 11, the inventive polymerizations (see open circles) allow for polymer films with significantly higher film haze at lower Z1/Z2 ratios of 0.81 and 0.75, as compared to the comparative polymerizations (see closed circles), which formed polymer films with significantly lower film haze at higher Z1/Z2 ratios of 1.29, 1.24 and 1.35. Furthermore, Z1/Z2 ratios greater than 1.50 (inventive examples of Table 10 and Table 11) can be used to form polymers films with a further reduction in film haze. As shown in Figure, 8-11, the Z1/Zn ratio is an important for changing product properties, such as MWD, melt strength and film optics. The Z1/Zn ratio can be varied by the Rn value as shown in Table 10.

The invention claimed is:

1. A high pressure polymerization process to form an ethylene-based polymer, the process comprising at least the following steps:
   feeding ethylene to a first reaction zone and to one or more subsequent reaction zones, and wherein for each subsequent reaction zone that receives fresh ethylene, the ratio, Rn (n=reaction zone number, n>1), of "mass fraction of fresh ethylene fed to the first reaction zone (RZ1)" to "mass fraction of fresh ethylene fed to the nth reaction zone (RZn)" is (Rn=RZ1/RZn) greater than 1, or is from 0 to 0.25, and
   wherein the "total amount of ethylene fed to the polymerization process" derives from at least one fresh ethylene stream and at least one recycled ethylene stream, and wherein the at least one recycled ethylene stream comprises at least one chain transfer agent and/or comprises at greater than, or equal to, 1 weight %, based on total amount of components in recycled ethylene stream, of one or more non-ethylene components, including the CTA, and
   wherein the inlet stream to each reaction zone comprises less than, or equal to, 5 weight ppm oxygen, based on the total weight of mass flows fed to the reaction zone.

2. The process of claim 1, wherein the process comprises at least one Primary compressor and at least one Booster compressor.

3. The process of claim 2, wherein the ethylene stream from the Booster compressor is fed only to one Primary compression flow, and wherein the Primary compressor has at least two separate compression flows.

4. The process of claim 1, wherein Rn is greater than 1.

5. The process of claim 1, wherein Rn is zero.

6. The process of claim 1, wherein the first reaction zone is a tubular reaction zone.

7. The process of claim 1, wherein, when no (0%) fresh ethylene is fed to the first reaction zone, the "amount of ethylene fed to the first reaction zone" derives only from at least one recycled ethylene stream.

8. The process of claim 1, wherein the "total amount of ethylene fed to the polymerization process" derives from a fresh ethylene stream and at least one recycled ethylene stream, and
   wherein the at least one recycled ethylene stream comprises at least one chain transfer agent, and
   wherein, when no (0%) fresh ethylene is fed to the first reaction zone, than the "amount of ethylene fed to the first reaction zone" derives only from the at least one recycled ethylene stream.

9. The process of claim 1, wherein from "greater than 0" to 100 weight percent of the total amount of fresh ethylene fed to the polymerization process is fed to the first reaction zone and/or to a sequential reaction zone.

10. The process of claim 1, wherein the process comprises only one Primary compressor.

11. The process of claim 1, wherein an initiator is added to at least one reaction zone of the polymerization, and wherein the initiator has a "half-life temperature at one second" greater than 255° C.

12. A high pressure polymerization process to form an ethylene-based polymer, the process comprising at least the following steps:
   feeding ethylene to a first reaction zone and to one or more subsequent reaction zones, and wherein 100 weight percent of the total amount of fresh ethylene fed to the polymerization process is fed to the first reaction zone, and
   wherein the "total amount of ethylene fed to the polymerization process" derives from at least one fresh ethylene stream and at least one recycled ethylene stream, and wherein the at least one recycled ethylene stream comprises at least one chain transfer agent and/or comprises greater than, or equal to, 1 weight %, based on total amount of components in recycled ethylene stream, of one or more non-ethylene components, including the CTA, and
   wherein the inlet stream to each reaction zone comprises less than, or equal to, 5 weight ppm oxygen, based on the total weight of mass flows fed to the reaction zone.

* * * * *